(12) United States Patent
Kim et al.

(10) Patent No.: US 11,540,253 B2
(45) Date of Patent: Dec. 27, 2022

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Seonwook Kim, Seoul (KR); Sukhyon Yoon, Seoul (KR); Joonkui Ahn, Seoul (KR); Hyunsoo Ko, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/671,124

(22) Filed: Feb. 14, 2022

(65) Prior Publication Data

US 2022/0167309 A1 May 26, 2022

Related U.S. Application Data

(63) Continuation of application No. PCT/KR2020/010876, filed on Aug. 14, 2020.

(60) Provisional application No. 62/916,175, filed on Oct. 16, 2019, provisional application No. 62/893,752, filed on Aug. 29, 2019, provisional application No. 62/886,919, filed on Aug. 14, 2019.

(30) Foreign Application Priority Data

Oct. 2, 2019 (KR) ........................ 10-2019-0122610
Nov. 6, 2019 (KR) ........................ 10-2019-0141105

(51) Int. Cl.
*H04W 72/00* (2009.01)
*H04W 52/24* (2009.01)
*H04W 56/00* (2009.01)
*H04W 72/04* (2009.01)

(52) U.S. Cl.
CPC ....... *H04W 72/005* (2013.01); *H04W 52/242* (2013.01); *H04W 56/001* (2013.01); *H04W 72/0446* (2013.01)

(58) Field of Classification Search
CPC ............ H04W 72/005; H04W 52/242; H04W 56/001; H04W 72/0446
See application file for complete search history.

(56) References Cited

U.S. PATENT DOCUMENTS

2019/0081753 A1   3/2019  Jung et al.
2019/0223205 A1   7/2019  Papasakellariou
2020/0304260 A1*  9/2020  Si ......................... H04L 5/0023
(Continued)

OTHER PUBLICATIONS

Intel Corporation, "Enhancements to initial access and mobility for NR-unlicensed," R1-1906786, 3GPP TSG RAN WG1 Meeting #97, Reno, Nevada, USA, May 13-17, 2019, 13 pages.
(Continued)

*Primary Examiner* — Raj Jain
(74) *Attorney, Agent, or Firm* — Fish & Richardson P.C.

(57) ABSTRACT

The present invention relates to a wireless communication system and, particularly, to a method comprising the steps of: receiving information related to interval Q between SS/PBCH blocks in a QCL relationship in an unlicensed band, through a PBCH; and estimating a downlink path loss for uplink transmission on the basis of a plurality of SS/PBCH blocks having the same modulo (X, Q) value as a specific SS/PBCH block index within a time window in the unlicensed band, and an apparatus therefor.

15 Claims, 26 Drawing Sheets

(56) References Cited

U.S. PATENT DOCUMENTS

2020/0374836 A1* 11/2020 Chen ................... H04L 1/1642
2021/0058207 A1*  2/2021 Lee ..................... H04L 5/0051
2022/0022250 A1*  1/2022 Cirik .................. H04W 74/085
2022/0109541 A1*  4/2022 Cirik ................... H04L 5/0023

OTHER PUBLICATIONS

International Search Report in International Appln. No. PCT/KR2020/010876, dated Nov. 27, 2020, 9 pages (with English translation).
LG Electronics, "Initial access and mobility for NR-U," R1-1906676, Presented at 3GPP TSG RAN WG1 #97, Reno, USA, May 13-17, 2019, 23 pages.
ZTE & Sanechips, "Discussion on enhancement of initial access procedures for NR-U," R1-1905952, Presented at 3GPP TSG RAN WG1 Meeting #97, Reno, USA, May 13-17, 2019, 15 pages.

* cited by examiner

Carrier aggregation between L-band and U-band

Standalone U-band(s)

FIG. 13

| | slot #0 | | slot #1 | | slot #2 | | slot #3 | | slot #4 | | slot #5 | | slot #6 | | slot #7 | | slot #8 | | slot #9 | |
|---|---|---|---|---|---|---|---|---|---|---|---|---|---|---|---|---|---|---|---|---|
| SS/PBCH block candidate index | 0 | 1 | 2 | 3 | 4 | 5 | 6 | 7 | 8 | 9 | 10 | 11 | 12 | 13 | 14 | 15 | 16 | 17 | 18 | 19 |
| PBCH DMRS sequence index | 0 | 1 | 2 | 3 | 4 | 5 | 6 | 7 | 0 | 1 | 2 | 3 | 4 | 5 | 6 | 7 | 0 | 1 | 2 | 3 |
| PBCH payload indication | 0 | 0 | 0 | 0 | 0 | 0 | 0 | 0 | 1 | 1 | 1 | 1 | 1 | 1 | 1 | 1 | 2 | 2 | 2 | 2 |
| QCL index (Q=4) | #0 | #1 | #2 | #3 | #0 | #1 | #2 | #3 | #0 | #1 | #2 | #3 | #0 | #1 | #2 | #3 | #0 | #1 | #2 | #3 |
| QCL index (Q=8) | #0 | #1 | #2 | #3 | #4 | #5 | #6 | #7 | #0 | #1 | #2 | #3 | #4 | #5 | #6 | #7 | #0 | #1 | #2 | #3 |

STW

FIG. 16

| Slot#k | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| CORESET #0 for SSB#n | CORESET #0 for SSB#n+1 | SSB#n | | | | | | SSB#n+1 | | | | | |

FIG. 17

| Slot#k | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| CORESET #0 for SSB#n | | CORESET #0 for SSB# n+1 | | SSB#n | | | | SSB#n+1 | | | | | |

FIG. 20

| | slot #0 | | slot #1 | | slot #2 | | slot #3 | | slot #4 | | slot #5 | | slot #6 | | slot #7 | | slot #8 | | slot #9 | |
|---|---|---|---|---|---|---|---|---|---|---|---|---|---|---|---|---|---|---|---|---|
| SS/PBCH block candidate index | 0 | 1 | 2 | 3 | 4 | 5 | 6 | 7 | 8 | 9 | 10 | 11 | 12 | 13 | 14 | 15 | 16 | 17 | 18 | 19 |
| PBCH DMRS sequence index | 0 | 1 | 2 | 3 | 4 | 5 | 6 | 7 | 0 | 1 | 2 | 3 | 4 | 5 | 6 | 7 | 0 | 1 | 2 | 3 |
| PBCH payload indication | 0 | 0 | 0 | 0 | 0 | 0 | 0 | 0 | 1 | 1 | 1 | 1 | 1 | 1 | 1 | 1 | 2 | 2 | 2 | 2 |
| QCL index (Q=4) | #0 | #1 | #2 | #3 | #0 | #1 | #2 | #3 | #0 | #1 | #2 | #3 | #0 | #1 | #2 | #3 | #0 | #1 | #2 | #3 |
| QCL index (Q=8) | #0 | #1 | #2 | #3 | #4 | #5 | #6 | #7 | #0 | #1 | #2 | #3 | #4 | #5 | #6 | #7 | #0 | #1 | #2 | #3 |

← STW →

Referece (e.g., RS) resource(s) obtained from SS/PBCH block candidates with a same modulo (X, Q) value as a specific SS/PBCH block index (e.g., SS/PBCH block index #1)

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a continuation of International Application No. PCT/KR2020/010876, filed on Aug. 14, 2020, which claims the benefit of Korean Application No. 10-2019-0141105, filed on Nov. 6, 2019, U.S. Provisional Application No. 62/916,175, filed on Oct. 16, 2019, Korean Application No. 10-2019-0122610, filed on Oct. 2, 2019, U.S. Provisional Application No. 62/893,752, filed on Aug. 29, 2019, and U.S. Provisional Application No. 62/886,919, filed on Aug. 14, 2019. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method of performing a channel measurement by a user equipment (UE) in a wireless communication system includes receiving information related to an interval Q between synchronization signal/physical broadcast channel (SS/PBCH) blocks which are placed in a quasi-co-located (QCL) relationship in an unlicensed band, on a physical broadcast channel (PBCH), and estimating a downlink path loss for an uplink transmission, based on a plurality of SS/PBCH blocks having a same modulo (X, Q) value as a specific SS/PBCH block index within a time window on the unlicensed band. Modulo represents a modulo operation, X is an integer equal to or larger than 0, representing a value related to a time order of an SS/PBCH block, and Q is a positive integer.

According to another aspect of the present disclosure, a UE in a wireless communication system includes at least one processor, and at least one computer memory which is operably coupled to the at least one processor and when executed, causes the at least one processor to perform operations. The operations include receiving information related to an interval Q between SS/PBCH blocks which are placed in a QCL relationship in an unlicensed band, on a PBCH, and estimating a downlink path loss for an uplink transmission, based on a plurality of SS/PBCH blocks having a same modulo (X, Q) value as a specific SS/PBCH block index within a time window on the unlicensed band. Modulo represents a modulo operation, X is an integer equal to or larger than 0, representing a value related to a time order of an SS/PBCH block, and Q is a positive integer.

According to a third aspect of the present disclosure, an apparatus for a UE includes at least one processor, and at least one computer memory which is operably coupled to the at least one processor and when executed, causes the at least one processor to perform operations. The operations include receiving information related to an interval Q between SS/PBCH blocks which are placed in a QCL relationship in an unlicensed band, on a PBCH, and estimating a downlink path loss for an uplink transmission, based on a plurality of SS/PBCH blocks having a same modulo (X, Q) value as a specific SS/PBCH block index within a time window on the unlicensed band. Modulo represents a modulo operation, X is an integer equal to or larger than 0, representing a value related to a time order of an SS/PBCH block, and Q is a positive integer.

According to a fourth aspect of the present disclosure, a computer-readable storage medium including at least one computer program which when executed, causes the at least one processor to perform operations is provided. The operations include receiving information related to an interval Q between SS/PBCH blocks which are placed in a QCL relationship in an unlicensed band, on a PBCH, and estimating a downlink path loss for an uplink transmission, based on a plurality of SS/PBCH blocks having the same modulo (X, Q) value as a specific SS/PBCH block index within a time window on the unlicensed band. Modulo represents a modulo operation, X is an integer equal to or larger than 0, representing a value related to a time order of an SS/PBCH block, and Q is a positive integer.

Q may be less than the number of SS/PBCH blocks defined in the time window.

Q may be an integer equal to or larger than 2.

The downlink path loss may be estimated based on all of the plurality of SS/PBCH blocks having the same modulo (X, Q) value as the specific SS/PBCH block index.

The uplink transmission may include a sounding reference signal (SRS) or a physical uplink shared channel (PUSCH).

The uplink transmission may further be performed based on the estimated downlink path loss.

According to the present disclosure, a wireless signal may be transmitted and received efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 13 illustrates an exemplary synchronization signal/physical broadcast channel (SS/PBCH) block transmission in an unlicensed band;

FIGS. 14 to 17 illustrate an exemplary PDCCH reception method according to an embodiment of the present disclosure;

FIGS. 19 and 20 illustrate an exemplary channel measurement process according to an embodiment of the present disclosure;

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
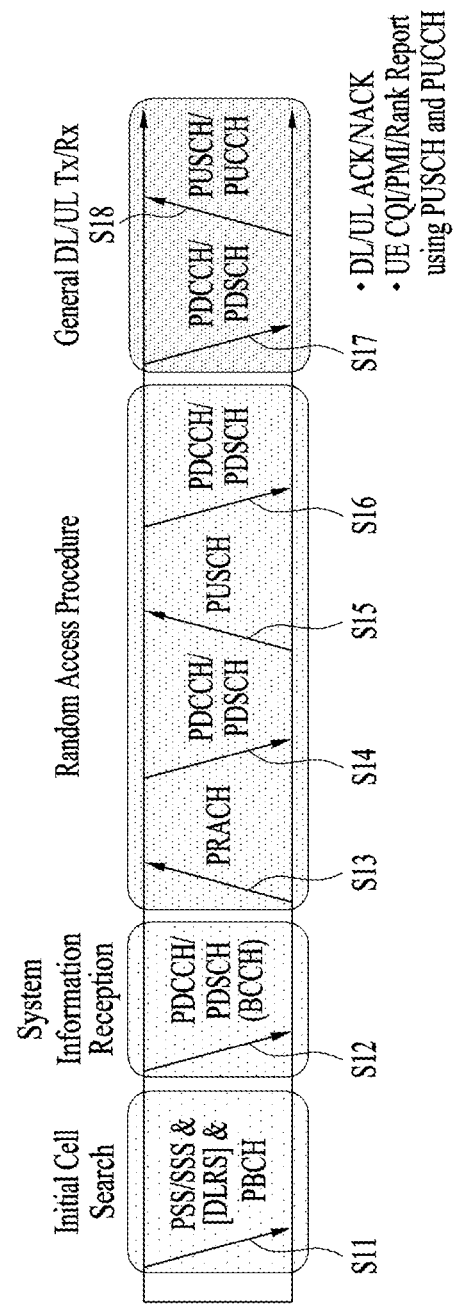
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
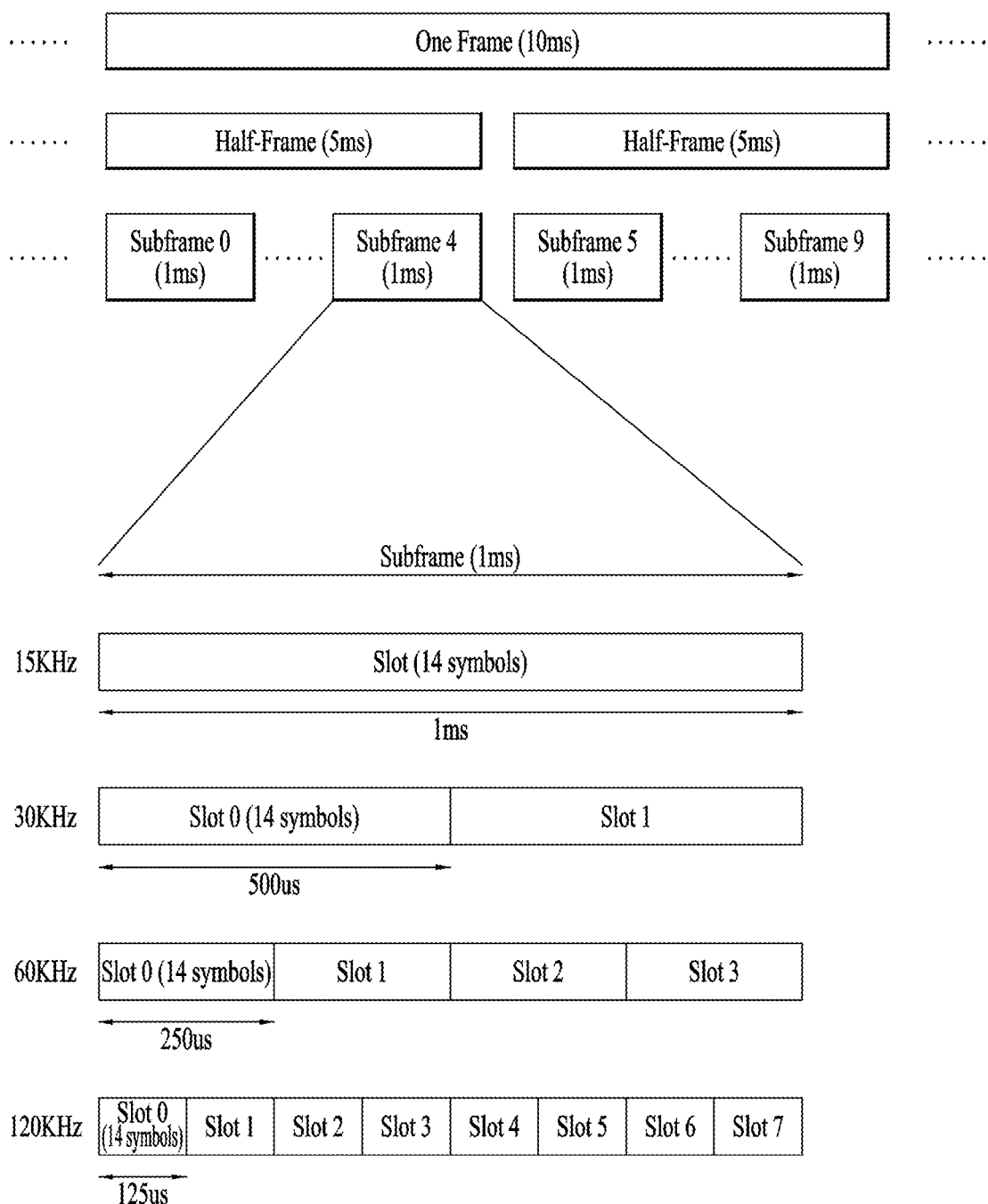
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

In NR, various numerologies (or SCSs) are supported to support various 5G services. For example, with an SCS of 15 kHz, a wide area in traditional cellular bands is supported, while with an SCS of 30 kHz/60 kHz, a dense urban area, a lower latency, and a wide carrier bandwidth are supported. With an SCS of 60 kHz or higher, a bandwidth larger than 24.25 GHz is be supported to overcome phase noise.

An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
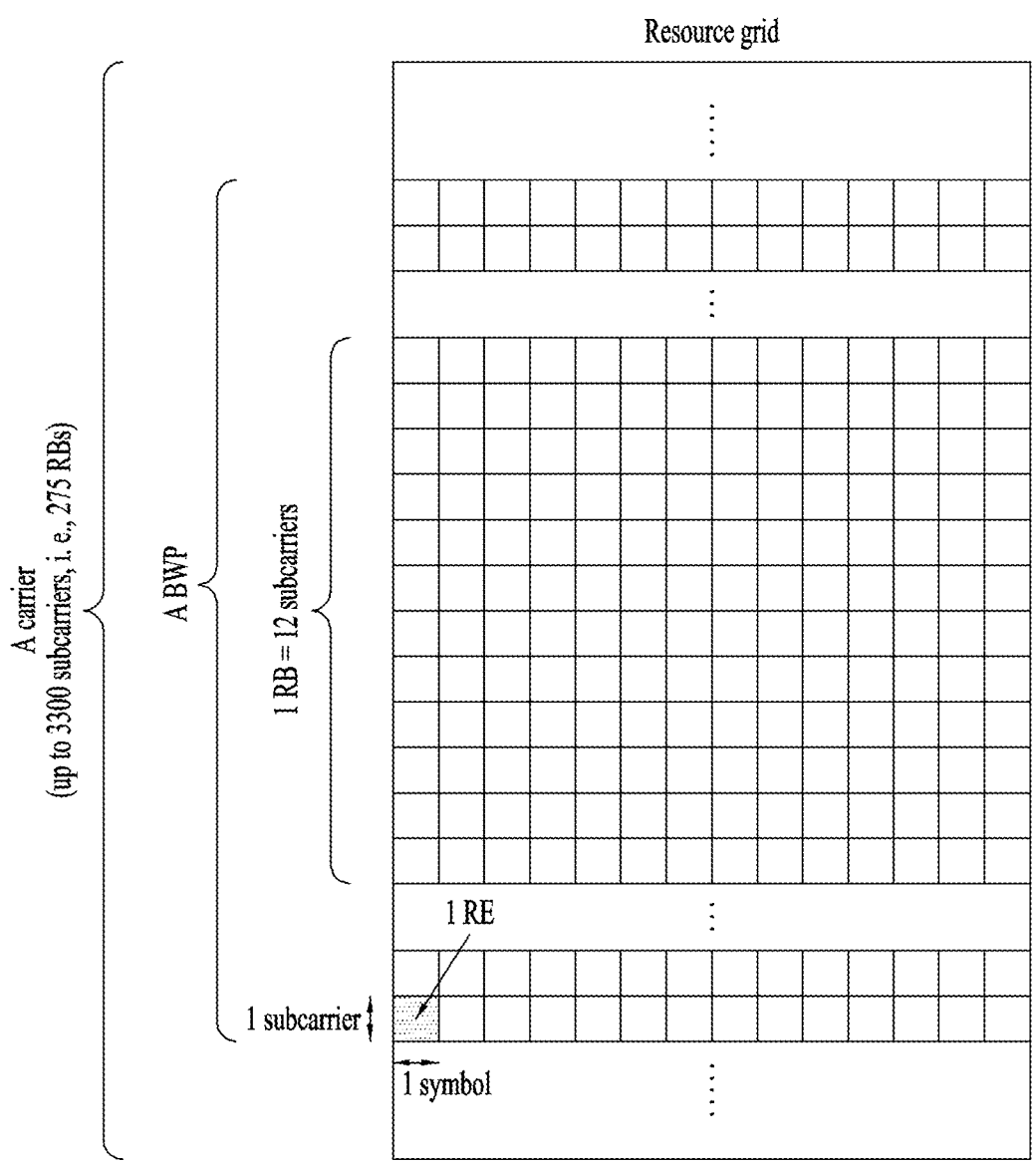
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
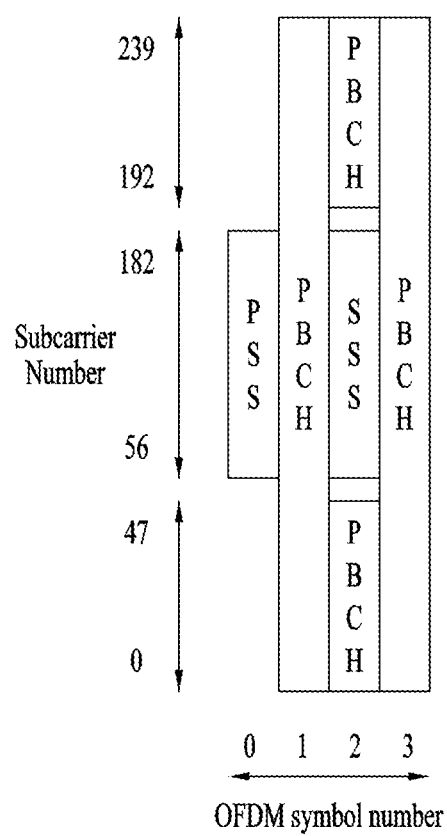
FIGS. 4 to 7 illustrate the structure/transmission of a synchronization signal block (SSB)

FIG. 4 illustrates the structure of an SSB. A UE may perform cell search, system information acquisition, beam alignment for initial access, DL measurement, and so on based on an SSB. The term SSB is interchangeably used with an SS/PBCH block. The SSB is made up of four consecutive OFDM symbols, each carrying a PSS, a PBCH, an SSS/PBCH, or a PBCH. Each of the PSS and the SSS includes one OFDM symbol by 127 subcarriers, and the PBCH includes 3 OFDM symbols by 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, and three data REs exist between DMRS REs.

Figure 5:
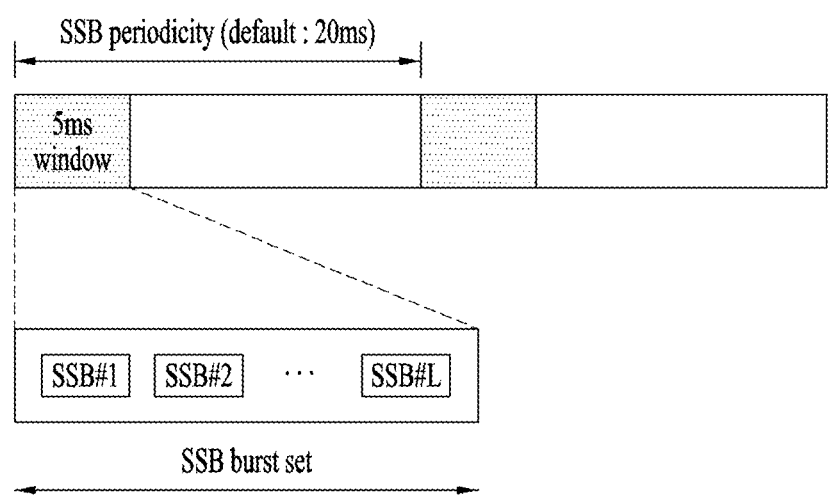

FIG. 5 illustrates exemplary SSB transmission. Referring to FIG. 5, an SSB is transmitted periodically according to an SSB periodicity. A default SSB periodicity that the UE assumes during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at the start of an SSB period. The SSB burst set includes a 5-ms time window (i.e., a half-frame), and an SSB may be transmitted up to L times in the SSB burst set. The maximum transmission number L of an SSB may be given as follows according to the frequency band of a carrier. One slot includes up to two SSBs.

For frequency range of up to 3 GHz, L=4
For frequency range from 3 GHz to 6 GHz, L=8
For frequency range from 6 GHz to 52.6 GHz, L=64

The time positions of SSB candidates in an SS burst set may be defined as follows according to SCSs. The time positions of SSB candidates are indexed with (SSB indexes) 0 to L−1 in time order in the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 fora carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 6:
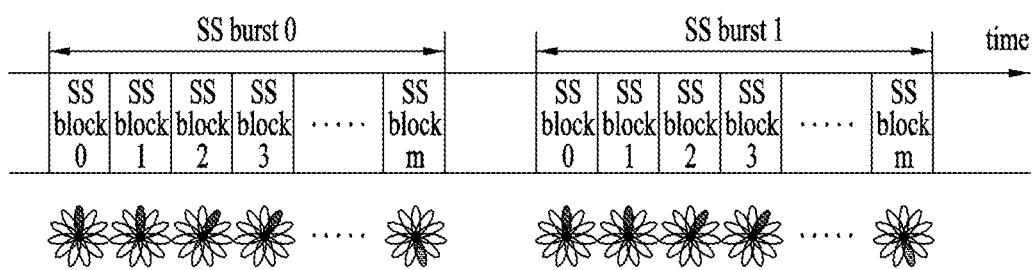

FIG. 6 illustrates exemplary multi-beam transmission of SSBs. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SSB beams is 1.

Figure 7:
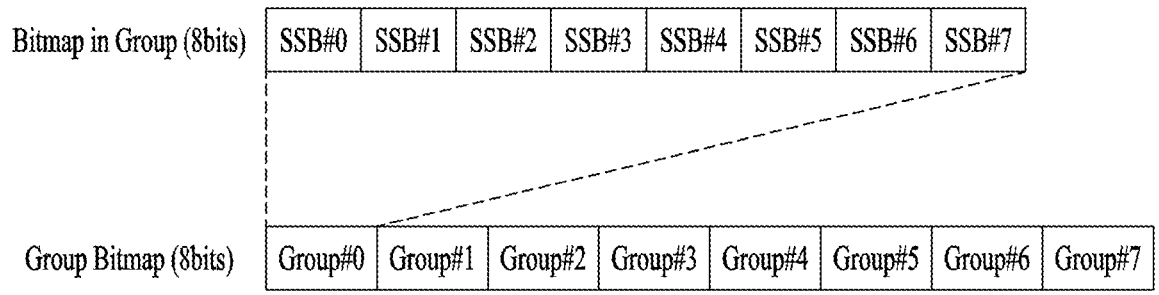

FIG. 7 illustrates an exemplary method of indicating an actually transmitted SSB, SSB_tx. Up to L SSBs may be transmitted in an SSB burst set, and the number/positions of actually transmitted SSBs may be different for each BS/cell. The number/positions of actually transmitted SSBs are used for rate-matching and measurement, and information about actually transmitted SSBs is indicated as follows.

If the information is related to rate-matching, the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 7. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

Figure 8:
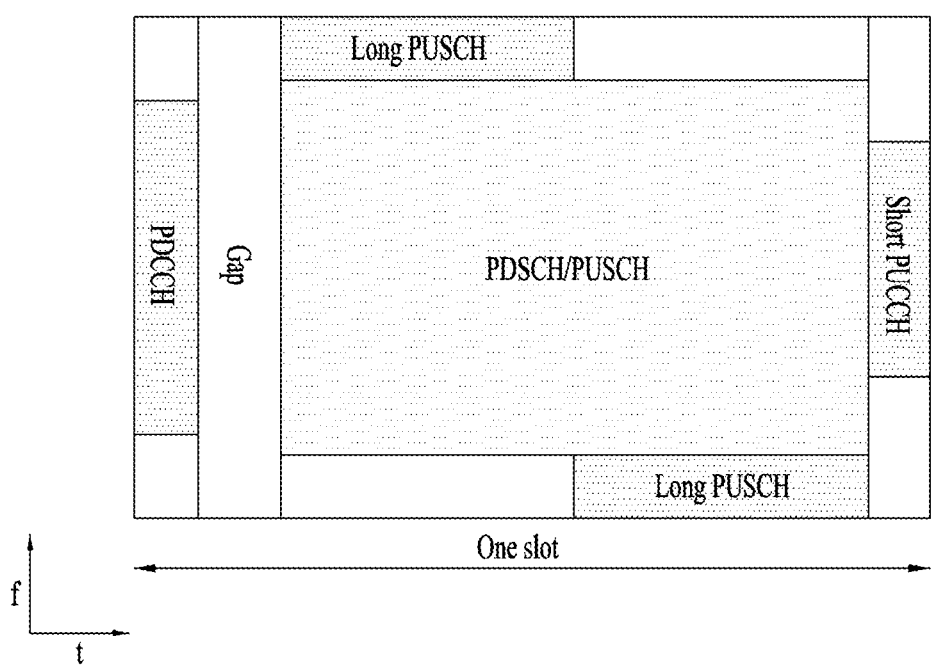
FIG. 8 illustrates mapping of physical channels in a slot.

FIG. 8 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

Table 4 lists PDCCH usages and transport channels. The transport channels are related to data delivered on a PDSCH/PUSCH scheduled by a PDCCH.

TABLE 4

| RNTI | Usage | Transport Channel |
| --- | --- | --- |
| P-RNTI | Paging and System Information change notification | PCH(Paging Channel) |
| SI-RNTI | Broadcast of System Information | DL-SCH |
| RA-RNTI | Random Access Response | DL-SCH |
| C-RNTI | Dynamically scheduled unicast transmission | UL-SCH, DL-SCH |
| SFI(Slot Format Indication)-RNTI | Slot Format Indication on the given cell | N/A |

The modulation scheme for the PDCCH is fixed (e.g., quadrature phase shift keying (QPSK), and one PDCCH includes 1, 2, 4, 8, or 16 control channel elements (CCEs). One CCE includes 6 resource element groups (REGs). One REG is defined by one OFDMA symbol and one (P)RB. The PDCCH is transmitted in a control resource set (CORESET). The CORESET corresponds to a physical resource/parameter set used to deliver the PDCCH/DCI in a BWP. For PDCCH reception, a UE may monitor (e.g., blind-decode) a set of PDCCH candidates in the CORESET. A PDCCH candidate is CCE(s) that the UE monitors for PDCCH reception/detection. PDCCH monitoring may be performed in one or more CORESETs of an active DL BWP in each active cell configured with PDCCH monitoring. A set of PDCCH candidates monitored by the UE is defined as a PDCCH search space (SS) set. The SS set may be a common search space (CSS) set or a UE-specific search space (USS) set.

Table 5 lists PDCCH SSs.

TABLE 5

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/ PUSCH) |

The PUCCH carries uplink control information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple input multiple output (MIMO)-related feedback information includes a rank indicator (RI) and a precoding matrix indicator (PMI).

Table 6 exemplarily shows PUCCH formats. PUCCH formats may be divided into short PUCCHs (Formats 0 and 2) and long PUCCHs (Formats 1, 3, and 4) based on the PUCCH transmission duration.

TABLE 6

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |

TABLE 6-continued

| PUCCH format | Length in OFDM symbols $N^{PUCCH}_{symb}$ | Number of bits | Usage | Etc |
|---|---|---|---|---|
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Figure 9:
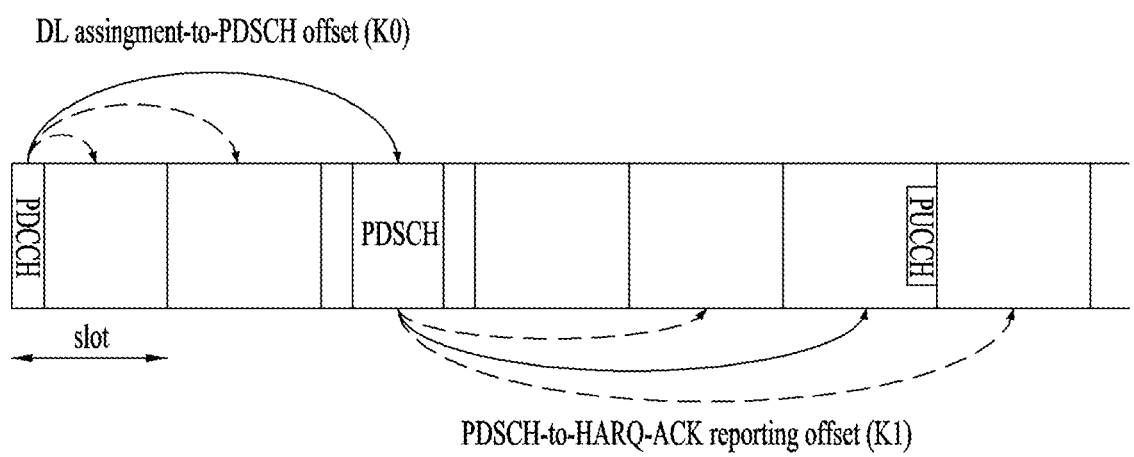
FIG. 9 illustrates an acknowledgment/negative acknowledgement (ACK/NACK) transmission process.

FIG. 9 illustrates an ACK/NACK transmission procedure. Referring to FIG. 9, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment (FDRA): Indicates an RB set assigned to the PDSCH.

Time domain resource assignment (TDRA): Indicates K0 and the starting position (e.g. OFDM symbol index) and duration (e.g. the number of OFDM symbols) of the PDSCH in a slot. TDRA may be indicated by a start and length indicator value (SLIV).

PDSCH-to-HARQ_feedback timing indicator: Indicates K1.

HARQ process number (4 bits): Indicates an HARQ process identify (ID) for data (e.g., PDSCH or TB).

PUCCH resource indicator (PRI): Indicates PUCCH resources to be used for UCI transmission among a plurality of resources in a PUCCH resource set.

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes HARQ-ACK responses to the plurality of PDSCHs.

Figure 10:
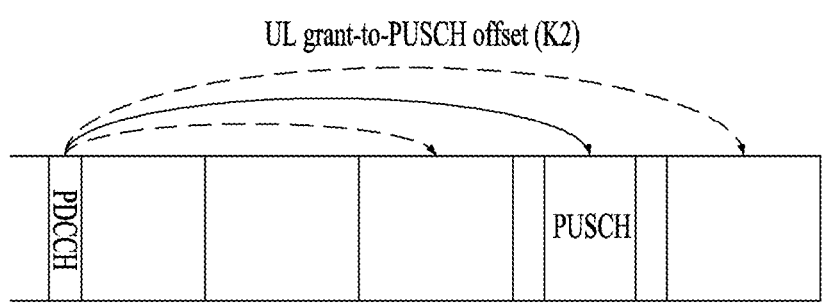
FIG. 10 illustrates a physical uplink shared channel (PUSCH) transmission process.

FIG. 10 illustrates an exemplary PUSCH transmission procedure. Referring to FIG. 10, a UE may detect a PDCCH in slot #n. The PDCCH may include UL scheduling information (e.g., DCI format 0_0, DCI format 0_1). DCI format 0_0 and DCI format 0_1 may include the following information.

FDRA: this indicates an RB set allocated to a PUSCH.

TDRA: this specifies a slot offset K2 indicating the starting position (e.g., symbol index) and length (e.g., the number of OFDM symbols) of the PUSCH in a slot. The starting symbol and length of the PUSCH may be indicated by a SLIV, or separately.

The UE may then transmit the PUSCH in slot #(n+K2) according to the scheduling information in slot #n. The PUSCH includes a UL-SCH TB. When the PUCCH transmission time overlaps with the PUSCH transmission time, UCI may be transmitted on the PUSCH (PUSCH piggyback).

Figure 11A:
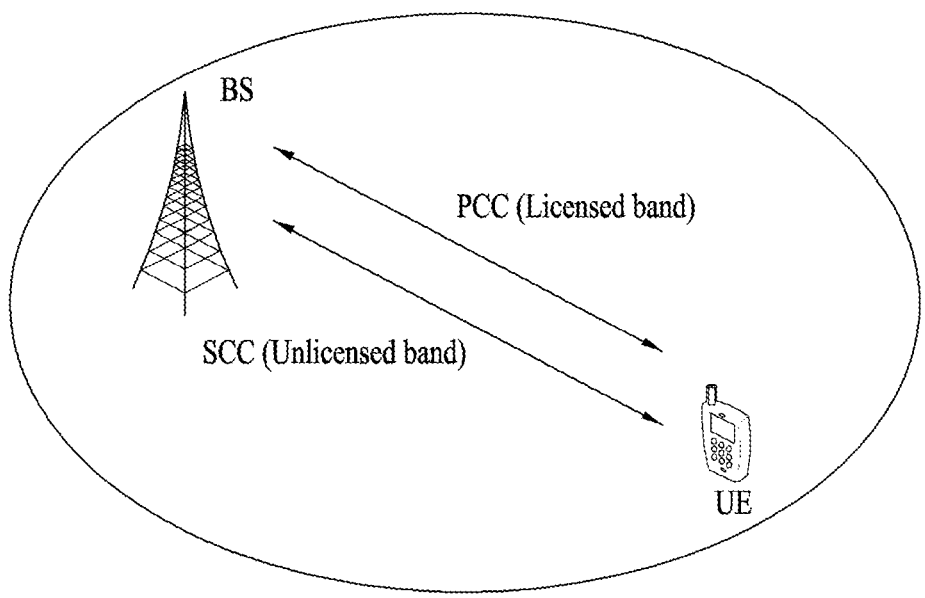
FIGS. 11A and 11B illustrate a wireless communication system supporting an unlicensed band.
Figure 11B:
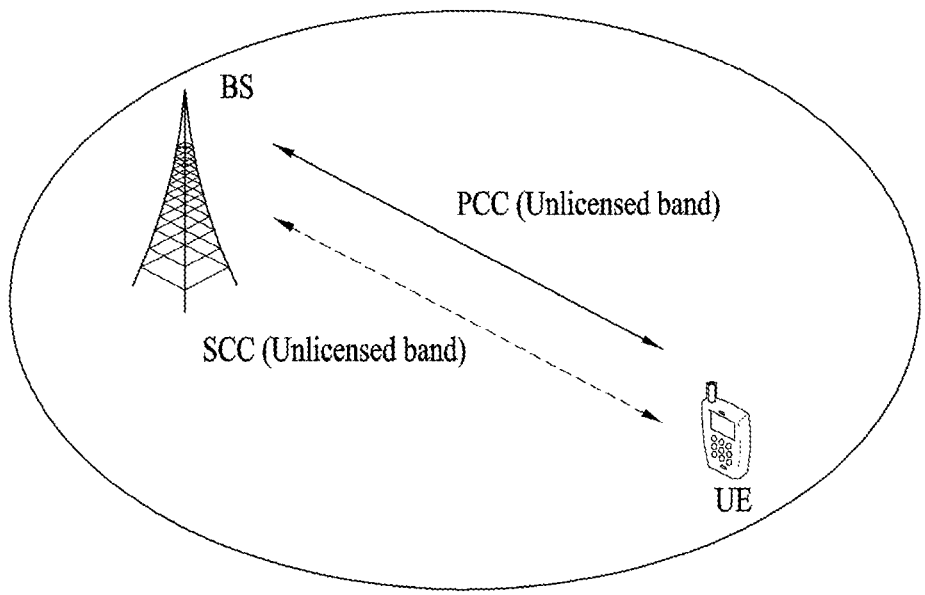

FIGS. 11A and 11B illustrate a wireless communication system supporting an unlicensed band. For the convenience of description, a cell operating in a licensed band (hereinafter, referred to as L-band) is defined as an LCell, and a carrier of the LCell is defined as a (DL/UL) licensed component carrier (LCC). In addition, a cell operating in an unlicensed band (hereinafter, referred to as a U-band) is defined as a UCell, and a carrier of the UCell is defined as a (DL/UL) unlicensed component carrier (UCC). The carrier of a cell may refer to the operating frequency (e.g., center frequency) of the cell. A cell/carrier (e.g., CC) may be collectively referred to as a cell.

When carrier aggregation (CA) is supported, one UE may transmit and receive signals to and from a BS in a plurality of cells/carriers. When a plurality of CCs are configured for one UE, one CC may be configured as a primary CC (PCC) and the other CCs may be configured as secondary CCs (SCCs). Specific control information/channel (e.g., CSS PDCCH or PUCCH) may be configured to be transmitted and received only on the PCC. Data may be transmitted in the PCC/SCC. FIG. 11A illustrates signal transmission and reception between a UE and a BS in an LCC and a UCC (non-standalone (NSA) mode). In this case, the LCC may be configured as a PCC, and the UCC may be configured as an SCC. When a plurality of LCCs are configured for the UE, one specific LCC may be configured as a PCC, and the remaining LCCs may be configured as SCCs. FIG. 11A corresponds to LAA of a 3GPP LTE system. FIG. 11B illustrates signal transmission and reception between a UE and a BS in one or more UCCs without any LCC (SA mode). In this case, one of the UCCs may be configured as a PCC, and the remaining UCCs may be configured as SCCs. Both the NSA mode and the SA mode may be supported in the unlicensed band of the 3GPP NR system.

Figure 12:
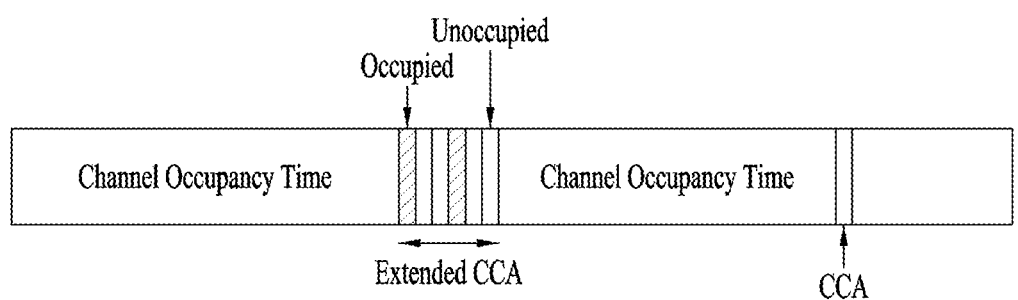
FIG. 12 illustrates a method of occupying resources in an unlicensed band.

FIG. 12 illustrates an exemplary method of occupying resources in an unlicensed band. According to regional regulations for an unlicensed band, a communication node should determine whether other communication node(s) is using a channel in the unlicensed band, before signal transmission. Specifically, the communication node may determine whether other communication node(s) is using a channel by performing carrier sensing (CS) before signal transmission. When the communication node confirms that any other communication node is not transmitting a signal, this is defined as confirming clear channel assessment (CCA). In the presence of a CCA threshold predefined by higher-layer signaling (RRC signaling), when the communication node detects energy higher than the CCA threshold in the channel, the communication node may determine that the channel is busy, and otherwise, the communication node may determine that the channel is idle. For reference, the WiFi standard (e.g., 801.11ac) specifies a CCA threshold of −62 dBm for a non-WiFi signal and a CCA threshold of −82 dBm for a WiFi signal. When determining that the channel is idle, the communication node may start signal transmission in a UCell. The above-described series of operations may be referred to as a listen-before-talk (LBT) or channel access procedure (CAP). LBT and CAP may be interchangeably used.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

Embodiment

In an NR system, a UE attempting initial access may acquire PDCCH configuration information for receiving system information (SI) (e.g., SI Block1 (SIB1)) from PBCH payload (or a master information block (MIB)). The PDCCH configuration information may include time/frequency resource information about a CORESET (hereinafter, CORESET #0) in which a PDCCH scheduling a PDSCH carrying SI will be transmitted, and a CSS set (hereinafter, type0-PDCCH CSS set) linked to CORESET #0. A UE may receive the PDCCH based on the PDCCH configuration information and obtain the SI on the PDSCH scheduled by the PDCCH. In addition, SI transmission corresponding to a PBCH may not be performed, which may be signaled by the PBCH payload (or MIB). Specifically, the PBCH payload (or MIB) may indicate information about a frequency offset between a synchronization raster (or global synchronization channel number (GSCN)) corresponding to the SS/PBCH block and an SI transmission frequency resource, or indicate that there is no SI transmission during a few GSGNs around the synchronization raster corresponding to the SS/PBCH block.

In consideration of the characteristics of an unlicensed band in which transmission is allowed only when a CAP is successful, a window duration (hereinafter, an SS/PBCH block transmission window (STW)) may be configured for a signal whose transmission with a specific periodicity is preferably guaranteed, such as an SS/PBCH block, and a plurality of transmission candidates (e.g., SS/PBCH block candidates) corresponding to one SS/PBCH block (index) may be configured within one STW duration. The term SS/PBCH block candidate may be interchangeably used with candidate SS/PBCH block. Even when a BS does not attempt an SS/PBCH block transmission in a specific transmission candidate due to CAP failure in the STW, the BS may perform a CAP in another transmission candidate corresponding to the SS/PBCH block in the STW, thereby increasing the transmission probability of the SS/PBCH block in the STW. Specifically, the STW may span a predetermined time period (e.g., 5 ms), and may be defined/configured to be repeated every predetermined period (e.g., 20 m). For a 15-kHz/30-kHz SCS, 5/10 slots may exist in a 5-ms window, and there may be two transmission candidates in each slot. That is, for the 15-kHz/30-kHz SCS, 10/20 transmission candidates may exist in each STW.

A minimum (time) interval between transmission candidates in which SS/PBCH (candidate) blocks having the same beam or SS/PBCH (candidate) blocks placed in a quasi-co-location (QCL) relationship may be transmitted may be defined as Q. Q may be defined as the number of (consecutive) SS/PBCH block candidates. Information about Q may be included in the PBCH payload. SS/PBCH (candidate) blocks having the same beam or the QCL relationship may mean that the same TX filtering may be applied from the viewpoint of the BS, or the same (spatial domain) RX filtering may be applied and SS/PBCH blocks received in different STWs may be soft-combined from the viewpoint of the UE. As described above, the transmission probability of an SS/PBCH block in the STW may be increased by configuring a plurality of transmission candidates corresponding to one beam (e.g., the same QCL index or the same SS/PBCH block index) in the STW.

Specifically, an SS/PBCH block candidate index in an STW may be signaled by a combination of a PBCH DMRS sequence index and PBCH payload. For example, as illustrated in FIG. 13, 20 SS/PBCH block candidate indexes may be generated/signaled by combining (1) 8 PBCH DMRS sequence indexes and (2) 2 bits (i.e., a PBCH payload indication) of the PBCH payload. For example, SS/PBCH block candidate index=PBCH payload indication (0 to 3)*8+PBCH DMRS sequence index (0 to 7). Upon detection of an SS/PBCH block in an STW, the UE may identify an SS/PBCH block candidate index from the PBCH payload indication and PBCH DMRS sequence index of the detected SS/PBCH block. When the operation results of modulo (SS/PBCH block candidate index, Q) and modulo (PBCH DMRS sequence index, Q) are the same, the UE may assume that the corresponding SS/PBCH block candidates (e.g., transmission candidates) are on the same beam. Modulo (A, B) represents the remainder of dividing A by B. In the present disclosure, the term SS/PBCH block candidate index may be replaced with SS/PBCH block index according to context.

Further, when the length of an STW duration may be configured by RRC signaling, there may be a constraint that the STW duration is not set shorter than a time period during which Q consecutive SS/PBCH block (candidate) indexes are transmitted. For example, when Q=8 is set for the 30-kHz SCS, the UE may not expect that an STW duration shorter than 4 slots is set. Alternatively, the BS may not transmit some of the Q SS/PBCH block (candidate) indexes, and there may be a restriction that the STW duration is not set shorter than the minimum interval between SS/PBCH block (candidate) indexes to be actually transmitted. For example, even though Q=8 for the 30-kHz SCS, only SS/PBCH blocks QCLed with SS/PBCH block (candidate) indexes 0/1/2/3 may be configured to be transmitted. In this case, the UE may not expect that the STW duration is set shorter than 2 slots in which a total of 4 SS/PBCH blocks may be transmitted.

A method of configuring a type0-PDCCH CSS set and monitoring a PDCCH, for SI acquisition is proposed below. In addition, when an SI transmission corresponding to a PBCH is not performed, a method of signaling no SI transmission in PBCH payload (or an MIB) and a method of interpreting the signaling by a UE are proposed. Further, a channel measurement is proposed.

Although the proposed methods of the present disclosure are described in the context of operations in an unlicensed band, they may be extended to operations in a licensed band according to the proposals. In addition, the term unlicensed band is interchangeably used with shared spectrum.

1) Receiver (Entity A; for Example, UE):
<Type0-PDCCH Monitoring>
[Method #1-1] A type0-PDCCH CSS set corresponding to a specific SS/PBCH block may be configured at an interval of L in an STW.

In this method, the specific SS/PBCH block may be an SS/PBCH block corresponding to a QCL index 'q' (q=0, 1, . . . , Q–1), a PBCH DMRS index 'd' (d=0, 1, . . . , 7), or an SS/PBCH block candidate index 'b' (b=0, 1, . . . , 19 for the 30-kHz SCS, and b=0, 1, . . . , 9 for the 15-kHz SCS).

In the STW, the interval L may be equal to Q, may be a value separately set in PBCH payload, or may be predefined as a specific value (e.g., L=8).

For example, when the specific SS/PBCH block is the SS/PBCH block corresponding to the QCL index 'q' (i.e., L=Q), the UE may perform type0-PDCCH monitoring associated with the SS/PBCH block in slots corresponding to SS/PBCH block candidate indexes having the same modulo (SS/PBCH block candidate index, Q) value or (PBCH DMRS sequence index, Q) value. For example, when Q=4 and the SS/PBCH block detected by the UE corresponds to QCL index '2' in FIG. 14, the UE may perform type0-PDCCH monitoring, assuming that there are type0-PDCCH monitoring occasions in slots (e.g., slots #1/#3/#5/#7/#9) corresponding to PBCH DMRS sequence indexes 2/6/10/14/18 (or PBCH DMRS sequence indexes 2/6/2/6/2).

In another example, when the specific SS/PBCH block is the SS/PBCH block corresponding to the PBCH DMRS index 'd', the UE may perform type0-PDCCH monitoring associated with the SS/PBCH block in slots corresponding to SS/PBCH block candidate indexes or (PBCH DMRS sequence indexes) having an interval of 8 (i.e., L=8) (or an interval indicated explicitly/implicitly) in the STW. Specifically, the UE may perform type0-PDCCH monitoring associated with the SS/PBCH block in slots corresponding to the same modulo (SS/PBCH block candidate index, 8) value or SS/PBCH block candidate indexes having the same PBCH DMRS sequence index value (or the PBCH DMRS sequence index). For example, when the SS/PBCH block detected by the UE corresponds to PBCH DMRS index '2' in FIG. 14, the UE may perform type0-PDCCH monitoring, assuming that there are type0-PDCCH monitoring occasions in slots (e.g., slots #1/#5/#9) corresponding to SS/PBCH block candidate indexes 2/10/18 (or PBCH DMRS sequence index 2/2/2).

In another example, when L being a period for monitoring type0-PDCCH in an STW is configured by PBCH payload or predefined, the UE may perform typ0-PDCCH monitoring associated with an SS/PBCH block in slots corresponding to SS/PBCH block candidate indexes 'b1+k*L' (k is an integer equal to or larger than 0; b1+k*L ranges from 0 to 19 in the 30-kHz SCS, and ranges 0 to 9 in the 15-kHz SCS), every interval of L from a specific SS/PBCH block candidate index 'b1' in the STW. For example, when L=5 and the SS/PBCH block detected by the UE corresponds to an SS/PBCH block candidate index '6' in FIG. 14, the UE may perform type0-PDCCH monitoring, assuming that there are type0-PDCCH monitoring occasions in slots (e.g., slots #0/#3/#5/#8) corresponding to SS/PBCH block candidate indexes 1/6/11/16.

The UE may assume that a type0-PDCCH associated with a specific SS/PBCH block (e.g., in the same beam direction) is actually transmitted in the same slot as the specific SS/PBCH block. In other words, when a specific SS/PBCH block is detected in a certain slot, the UE may expect that a type0-PDCCH associated with the SS/PBCH block is transmitted in the same slot. Alternatively, when a specific SS/PBCH block expected in a certain slot is not detected, the UE may expect that a type0-PDCCH associated with the SS/PBCH block is not transmitted in the same slot (or, the UE may expect that the associated type0-PDCCH is not transmitted in the slot, and thus skip type0-PDCCH monitoring).

Alternatively, (1) a specific SS/PBCH block and (2) its associated type0-PDCCH may be allowed to be transmitted in different slots, and a slot offset between (1) the specific SS/PBCH block and (2) the associated type0-PDCCH may be signaled by PBCH payload.

In addition, when Q is unknown (e.g., when Q is signaled by SI, instead of PBCH payload), the proposed method may be applied by defining a default Q value. The default Q value may be 1 (i.e., it is assumed that there are type0-PDCCH monitoring occasions in all slots), or when there is a set of configurable Q values, the default Q value may be the minimum or maximum value of the set. Alternatively, depending on what value is set as M in Table 7 by the PBCH, the UE may assume a different Q value. For example, the UE may assume that when M=1/2, Q=2, and when M>1/2, Q=1. When Q=1 and M=1/2, the UE should perform type0-PDCCH monitoring at least twice in each slot, thereby increasing the PDCCH decoding complexity of the UE, and making it difficult for the BS to transmit another PDCCH in the corresponding type0-PDCCH monitoring occasions. Therefore, when Q=1, the UE may not expect type0-PDCCH monitoring twice in the same slot, compared to the case of M=1/2.

Table 7 lists parameters related to PDCCH monitoring occasions for a type0-PDCCH CSS set. The indexes in Table 7 are obtained from pdcch-ConfigSIB1 in an MIB.

TABLE 7

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N^{CORESET}_{symb}$, if i is odd} |
| 2 | 2 | 1 | 1 | 0 |
| 3 | 2 | 2 | 1/2 | {0, if i is even}, {$N^{CORESET}_{symb}$, if i is odd} |
| 4 | 5 | 1 | 1 | 0 |
| 5 | 5 | 2 | 1/2 | {0, if i is even}, {$N^{CORESET}_{symb}$, if i is odd} |
| 6 | 7 | 1 | 1 | 0 |
| 7 | 7 | 2 | 1/2 | {0, if i is even}, {$N^{CORESET}_{symb}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

When candidate values for Q are {1, 2, 4, 8}, sub-sets of the Q values may be configured by 1-bit information of the PBCH payload (or MIB). This may be considered to minimize signaling of Q in consideration of the limited number of bits in the PBCH payload. For example, when the value of the corresponding 1-bit field is '0', it may signal that Q is one of {1, 2}, and when the value of the 1-bit field is '1', it may signal that Q is one of {4, 8}. In another example, when the value of the 1-bit field is '0', it may signal that Q is one of {1, 2, 4}, and when the value of the 1-bit field is '1', it may signal that Q is {8}. In another example, when the value of the 1-bit field is '0', it may signal that Q is one of {1, 2, 4}, and when the value of the 1-bit field '1', it may signal that Q is one of {4, 8}. In this case, the proposed method may be applied by defining a default Q value. The default Q value may be the minimum value (or maximum value) of a subset configured by the PBCH payload. For example, when the value '0' of the 1-bit field in the PBCH payload indicates that Q is one of {1, 2} and the value '1' of the 1-bit field indicates that Q is one of {4, 8}, a UE receiving '0' may assume the default Q=1, and a UE receiving '1' may assume that the default Q=4.

In the NR system, monitoring occasions are determined for a type0-PDCCH CSS set as illustrated in Table 7. For example, the UE may perform PDCCH monitoring in a type0-PDCCH CSS set over two consecutive slots starting from slot no. In a licensed band, no may be determined for an SS/PBCH block index i by Equation 1.

$$n_0 = (O \cdot 2^\mu + \lfloor i \cdot M \rfloor) \bmod N^{frame,\mu}_{slot} \quad [\text{Equation 1}]$$

In [Equation 1], O, i and M are defined in Table 7, and u and $N^{frame,\mu}_{slot}$ are defined in Table 1. $n_0$ indicates a slot index in a system frame number (SFN), SFNc.

SFNc may be determined to be a value satisfying [Equation 2].

$$SFNc \bmod 2 = 0,$$
$$\text{if } \lfloor (O \cdot 2^\mu + \lfloor i \cdot M \rfloor)/N^{frame,\mu}_{slot} \rfloor \bmod 2 = 0 \quad [\text{Equation 2}]$$
$$SFNc \bmod 2 = 1,$$
$$\text{if } \lfloor (O \cdot 2^\mu + \lfloor i \cdot M \rfloor)/N^{frame,\mu}_{slot} \rfloor \bmod 2 = 1$$

Figure 14:
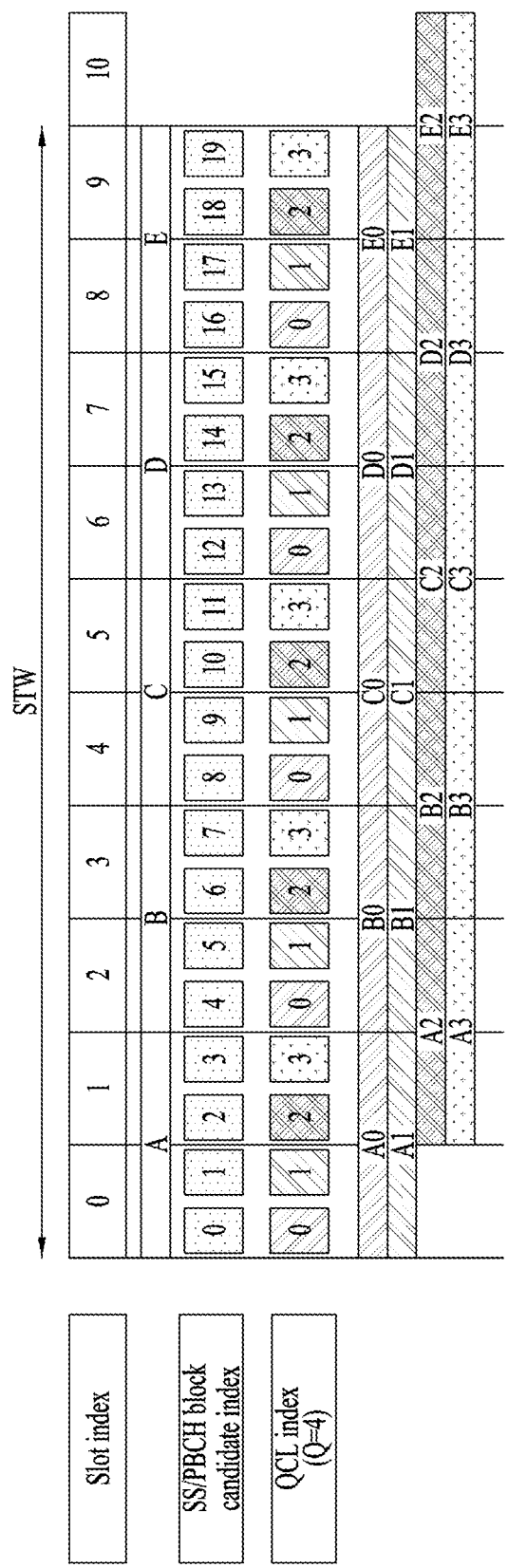

In the unlicensed band, when an STW is a 5-ms window starting from a frame boundary, Q=4, the index i of an equation determining no in [Equation 1] is replaced with an SS/PBCH block candidate index of FIG. 14, and index #1 of Table 7 is signaled, monitoring occasions may be determined for a type0-PDCCH CSS set as illustrated in FIG. 14. In FIG. 14, A0 indicates monitoring occasions for a type0-PDCCH CSS set linked to an SS/PBCH corresponding to QCL index #0 in an A period (i.e., slot indexes #0/1) at the slot level.

Figure 15:
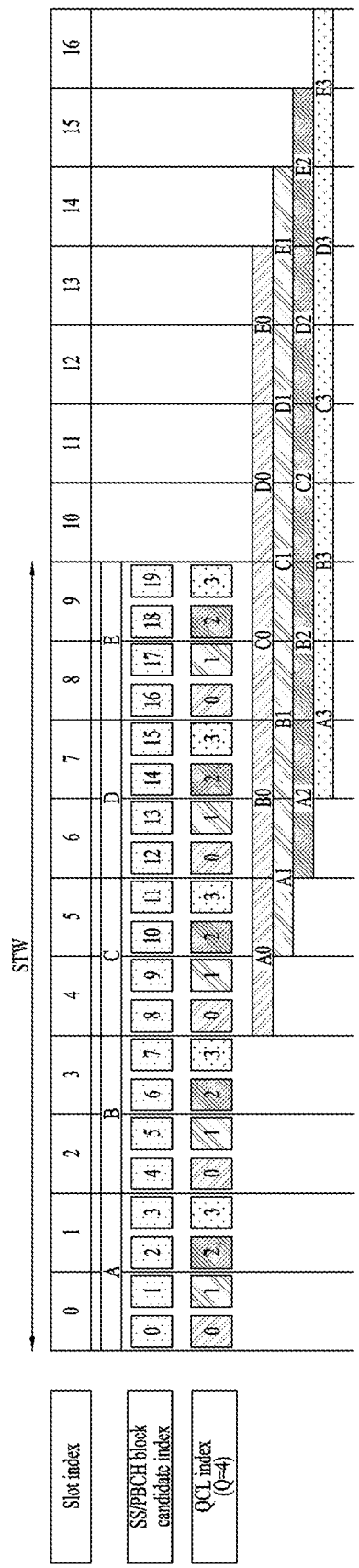
Figure 18:
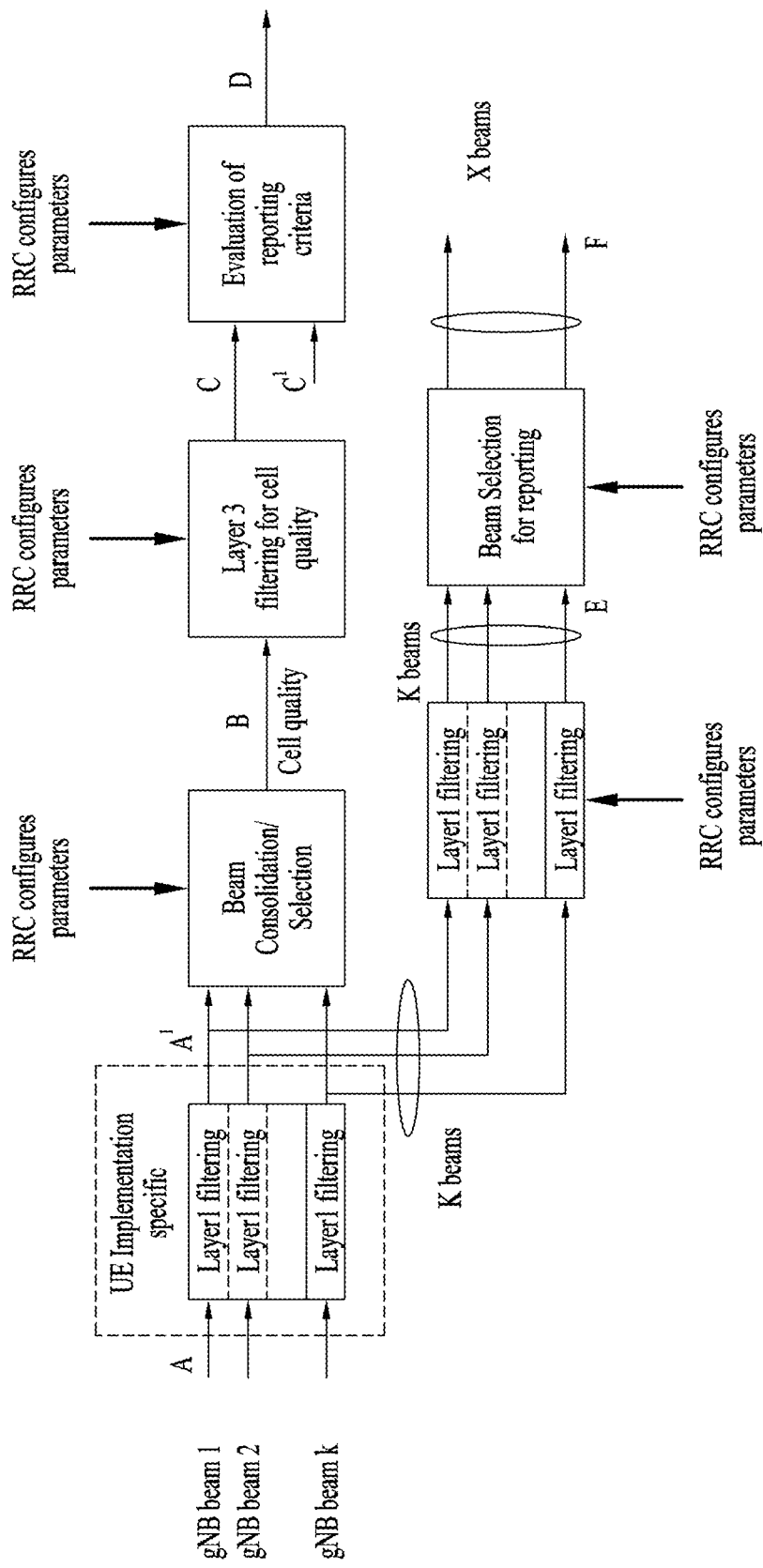
FIG. 18 illustrates an exemplary channel measurement process.

In another example, when index #2 of Table 7 is signaled, monitoring occasions may be determined for a type0-PDCCH CSS set as illustrated in FIG. 15.

When [Method #1-1] is applied to FIG. 14, type0-PDCCH monitoring may not be performed for slot index #10. In addition, when [Method #1-1] is applied to FIG. 15, type0-PDCCH monitoring may not be performed for slot indexes #10 to #16.

Further, when an STW is a 5-ms window starting from a frame boundary and one of the indexes #4/5/6/7/9/14/15 in Table 7 is signaled, the value of 0 is 5 or more and thus, the STW does not overlap with type0-PDCCH monitoring occasions (MOs). In this case, the STW and the type0-PDCCH MOs which do not overlap with the STW may increase resource consumption for reception of an SS/PBCH and SI. That is, when an STW is a 5-ms window (or a part thereof) starting from a frame boundary, the UE does not expect one of the indexes #4/5/6/7/9/14/15 of Table 7 to be signaled, or when signaled, the UE may consider that there is no type0-PDCCH MO. Alternatively, when the STW belongs to the second 5 ms instead of the first 5 ms in a frame, the UE may not expect that one of the indexes #0/1/2/3/8/10/11/12/13 of Table 7 will be signaled. When signaled, the UE may consider that there is no type0-PDCCH MO. In this case, type0-PDCCH monitoring may be allowed even outside the STW (e.g., slot index #10 of FIG. 14 and slot indexes #10 to #16 of FIG. 15).

[Method #1-2] when two 1-symbol CORESETs, CORESET #0 corresponding to two SS/PBCH blocks (SSBs) are configured in the same slot (FIG. 16), beam switching operations/overhead of the BS/UE may be reduced by exchanging the symbol positions of CORESET #0 for SSB #n and CORESET #0 for SSB #n+1 with each other.

As one of the configurations for CORESET #0 and a type0-PDCCH CSS set provided by the legacy NR system, (1) an SSB and (2) a corresponding CORESET #0 may be transmitted in the same slot, and each CORESET #0 may be configured with 1 symbol, as illustrated in FIG. 16. Particularly in the NR-U system, even the BS may transmit a DL signal only when succeeding in a CAP. Accordingly, it may be advantageous from the viewpoint of DL transmission to collect and transmit related information in the same slot as much as possible and thus reduce the number of CAP attempts. However, in the case of transmission and reception as illustrated in FIG. 16, a problem may occur in a beam switching operation/overhead of the BS/UE, and thus this method is proposed to overcome the problem.

Referring to FIG. 16, CORESET #0 for SSB #n+1 may be transmitted in symbol #0, and CORESET #0 for SSB #n may be transmitted in symbol #1. According to the proposed method, the UE may perform type0-PDCCH monitoring corresponding to SSB #n in symbol #1 in slot #k, and type0-PDCCH monitoring corresponding to SSB #n+1 in symbol #0 in slot #k. Herein, an SSB index may mean an SS/PBCH block candidate index, a PBCH DMRS sequence index, or a QCL index in FIG. 13.

[Method #1-3] When two 2-symbol CORESETs, CORESET #0 corresponding to two SS/PBCH blocks (SSBs) are configured in the same slot (e.g., FIG. 17), at least one of the following options may be applied.

As one of the configurations for CORESET #0 and a type0-PDCCH CSS set provided by the legacy NR system, (1) an SSB and (2) a corresponding CORESET #0 may be transmitted in the same slot, and each CORESET #0 may be configured with 2 symbols, as illustrated in FIG. 17. Particularly in the NR-U system, even the BS may transmit a DL signal only when succeeding in a CAP. Accordingly, it may be advantageous from the viewpoint of DL transmission to collect and transmit related information in the same slot as much as possible and thus reduce the number of CAP attempts (see FIG. 17). However, in the case of transmission and reception as illustrated in FIG. 17, a specific SSB may overlap with a CORESET (which is not associated with the SSB), and thus this method is proposed to overcome the problem.

Option 1: When two 2-symbol CORESETs, CORESET #0 are configured in the same slot, CORESET #0 for SSB #n+1 may be ignored in consideration of overlap between a CORESET and an SSB. That is, when two 2-symbol CORESETs, CORESET #0 are configured in the same slot, the UE may assume that (1) SSB #n+1 and (2) CORESET #0 for SSB #n+1 are not transmitted in a corresponding cell. Accordingly, an operation of detecting SSB #n+1 may be omitted. In FIG. 17, an SSB index may mean an SS/PBCH block candidate index, a PBCH DMRS sequence index, or a QCL index in FIG. 13.

Option 2: Upon detection of SSB #n+1, the UE may assume that (1) SSB #n and (2) CORESET #0 for SSB #n are not transmitted in a corresponding slot, in consideration of overlap between a CORESET and an SSB. Alternatively, when recognizing or receiving signaling indicating that SSB #n is not transmitted, the UE may expect to receive (1) SSB #n+1 and (2) CORESET #0 for SSB #n+1 in slot #k in which SSB #n+1 may be transmitted (or detected).

Option 3: The symbol positions of CORESET #0 for SSB #n and CORESET #0 for SSB #n+1 may be exchanged with each other over time. For example, when SSB #n and SSB #n+1 are also transmitted in slot #k+p (e.g., a time apart from slot #k by an STW duration), CORESET #0 for SSB #n+1 may be transmitted in symbol #0/1, and CORESET #0 for SSB #n may be transmitted in symbol #2/3 in slot #k+p. Herein, p may correspond to the STW duration or Q or L in Method #1-1. The UE may perform type0-PDCCH monitoring corresponding to SSB #n in symbol #0/1, and may not perform type0-PDCCH monitoring corresponding to SSB #n+1 or may perform in symbol #2/3, in slot #k. In addition, the UE may perform type0-PDCCH monitoring corresponding to SSB #n in symbol #2/3, and may not perform type0-PDCCH monitoring corresponding to SSB #n+1 or may perform type0-PDCCH monitoring corresponding to SSB #n+1 in symbol #0/1, in slot #k+p.

<No RMSI Indication>

[Method #2-1] in the case of an SS/PBCH block transmitted in a synchronization saster (or GSCN) defined in the unlicensed band, the UE may expect that a configuration for a type0-PDCCH CSS set is always signaled by the SS/PBCH block.

In this method, the SS/PBCH block transmitted in the synchronization raster may refer to an SS/PBCH block transmitted with the synchronization raster (or GSCN) pre-defined in the unlicensed band (e.g., 5 GHz or 6 GHz band) used as the center frequency.

Different operators (or operators having different PLMN IDs) operating NR-U systems may coexist even in the same frequency band. In general, PLMN ID information may be signaled by an SIB. A type0-PDCCH CSS set may not be configured in the SS/PBCH block transmitted in the synchronization raster. Instead, information about another synchronization raster carrying an SIB may be signaled by the PBCH. In this case, the UE may move to the synchronization raster without determining whether the corresponding SS/PBCH block matches a PLMN ID servicing the UE, and a considerably large delay time may be involved in initial access. To solve this problem, the UE may expect that the SS/PBCH block transmitted in the synchronization raster in the unlicensed band always configures a type0-PDCCH CSS set. More specifically, the UE may expect that the value of k {SSB} signaled in the PBCH of the SS/PBCH block transmitted in the synchronization raster in the unlicensed band is 23 or less (or the UE does not expect that the value of k {SSB} is greater than 23).

Alternatively, an SS/PBCH block transmitted in a frequency other than the synchronization raster (or GSCN) in the unlicensed band may be restrictively allowed as an SS/PBCH block that does not configure a type0-PDCCH CSS set.

Alternatively, the proposed method may also be applied to an SS/PBCH block transmitted in the frequency other than the synchronization raster (or GSCN) in the unlicensed band. That is, the UE may expect that the value of k {SSB} signaled by the PBCH of the SS/PBCH block transmitted in the frequency other than the synchronization raster in the unlicensed band is 23 or less (or the UE does not expect that the value of k_{SSB} is greater than 23). As described in <RMSI transmission on SCell or non-standalone cell>, this is because there is a need for providing information about CORESET #0 and/or a Type0-PDCCH CSS set even in the PBCH of the SS/PBCH block transmitted in the frequency other than the synchronization raster to prevent confusion of the UE which may otherwise be caused by the use of the same ID between cells.

[Method #2-2] A shortened PLMN ID value may be signaled by PBCH payload.

As described in [Method #2-1], when a PLMN ID value is signaled by an SIB, a large delay time may be caused during initial access of the UE which has detected an SS/PBCH block that does not configure a type0-PDCCH CSS set. Therefore, the delay time may be reduced by directly signaling the PLMN ID value by PBCH payload. Specifically, when the PLMN ID value signaled by the PBCH payload is identical to a PLMN ID expected by the UE, and the corresponding PBCH indicates another GSCN value without configuring information about a type0-PDCCH CSS set, the UE may move to the GSCN value and receive an SS/PBCH block corresponding to the same PLMN ID value. In this case, the BS may provide only information about a GSCN that operates the PLMN ID in the PBCH payload to the UE. On the contrary, when the PLMN ID value signaled by the PBCH payload is different from the PLMN ID expected by the UE, and the corresponding PBCH indicates another GSCN value without configuring information about a type0-PDCCH CSS set, the UE may attempt to receive another SS/PBCH block in the current GSCN (or by moving to an additional GSCN) without moving to the corresponding GSCN value.

In addition, when the PBCH indicates another GSCN value without configuring type0-PDCCH CSS set information, the PBCH may signal a PLMN ID operating in the GSCN. Even though the PLMN ID value signaled by the PBCH is different from the PLMN ID value expected by the UE, when the PLMN ID value operating in the GSCN is identical to the PLMN ID value expected by the UE, the UE may move to the signaled GSCN and attempt to initial access.

In this method, a PLMN ID may be a value obtained by truncating N MSB (or LSB) bits from full information, not the full information, in consideration of PBCH payload. N is an integer greater than or equal to 1. For example, 2-bit shortened PLMN ID information obtained by truncating 3 or 4 MSB bits from a 5 or 6-bit PLMN ID may be signaled by PBCH payload.

[Method #2-3] When an SS/PBCH block transmitted on GSCN #1 in the unlicensed band signals that a type0-PDCCH is transmitted on GSCN #2, the UE may reinterpret the GSCN #2 value according to CAP-BW unit-based channelization.

In this method, GSCN #2=GSCN #1+offset and the offset may be signaled by a PBCH transmitted on GSCN #1.

In this method, a CAP-BW is a basic unit for performing a CAP/LBT, and a specific value for each frequency band may be predefined (e.g., the CAP-BW is 20 MHz in a 5-GHz band) or signaled. For coexistence with heterogeneous systems such as Wi-Fi and LTE LAA, channelization may be aligned in the CAP-BWP.

Multiple GSCNs may exist in a CAP-BW, and only a fairly limited number (e.g., 1 or 2) of synchronization rasters may be defined per CAP-BW in consideration of the initial access complexity of an NR-U UE. Therefore, the value of GSCN #2 may not match an actual synchronization raster position. According to the proposed method, the signaled GSCN #2 value may be reinterpreted as a synchronization raster closest to GSCN #2 or as a (specific) synchronization raster defined in the CAP-BW including GSCN #2. For example, the UE may identify that GSCN #2 belongs to a U-band from a frequency band to which GSCN #2 belongs, and a CAP-BW may be predefined for each U-band. Based on this, the UE may reinterpret the value of GSCN #2 as a synchronization raster closest to GSCN #2 or as a (specific) synchronization raster defined in the CAP-BW including GSCN #2. For example, the (specific) synchronization raster may be a synchronization raster closest to the center frequency of the CAP-BW or a synchronization raster having the smallest frequency value within the CAP-BW.

<RMSI Transmission on SCell or Non-Standalone Cell>

Since different operators may coexist in the unlicensed band, cells belonging to the different operators may have the same (physical) cell ID. To eliminate the resulting confusion of the UE, the BS may transmit higher-layer signaling (e.g., SIB1) including operator ID, PLMN ID, or global cell ID information. For example, when there is gNB #X transmitting an SSB in frequency #X (frequency #X may not identical to a synchronization raster), and there is UE #Y associated with gNB #Y, gNB #Y may instruct UE #Y to measure frequency #X. UE #Y, which has measured frequency #X, may report a detected cell ID of gNB #X and a measurement result of the corresponding cell to gNB #Y. When gNB #Y receiving the report is not aware that whether gNB #X is the same operator, gNB #Y may instruct the UE to read higher-layer signaling (e.g., SIB1) including the operator ID, PLMN ID, or global cell ID information about gNB #X and report corresponding information. After receiving the corresponding information about gNB #X from the UE, gNB #Y may update operator information about gNB #X. In consideration of this operation, gNB #X which transmits an SSB in frequency #X needs to explicitly or implicitly transmit information about PDCCH monitoring occasions for scheduling a PDSCH carrying the higher-layer signaling including the operator ID, PLMN ID, or global cell ID information (hereinafter referred to as SIB1 for convenience).

A method of configuring PDCCH monitoring occasion information for explicitly or implicitly scheduling a PDSCH carrying SIB1 and/or corresponding SIB1 information and/or configuring SIB information is proposed below.

[Method #3-1] Method of indicating a specific synchronization raster in 20 MHz corresponding to frequency #X or 20 MHz not corresponding to frequency #X by an SSB (particularly, PBCH payload) transmitted in frequency #X When a plurality of synchronization rasters per 20 MHz (especially at 5 GHz) are defined in NR-U, a specific one of a plurality of synchronization rasters in 20 MHz corresponding to frequency #X may be signaled by an SSB (e.g., PBCH payload) transmitted in frequency #X. Alternatively, a specific synchronization raster value within 20 MHz other than the 20 MHz corresponding to frequency #X may be signaled by the SSB (e.g., PBCH payload) transmitted in frequency #X (e.g., a synchronization raster carrying RMSI is signaled with a granularity sparser than a granularity supported in [Method #2-30 or legacy Rel-15 NR). The UE may acquire frequency resource information about a CORESET including a PDCCH scheduling an SIB1 PDSCH, based on a pre-agreed PRB offset with respect to the signaled specific synchronization raster.

In signaling a specific synchronization raster value within 20 MHz other than the 20 MHz corresponding to frequency #X, frequency information about a CORESET within 20 MHz not corresponding to frequency #X and information about time-axis monitoring occasions of the CORESET may be simultaneously indicated by the SSB (e.g., PBCH payload) transmitted in frequency #X. Herein, some bit(s) of bits used to indicate another synchronization raster carrying RMSI in 3GPP Rel-15 NR may indicate information about time-axis monitoring occasions of a CORESET (or information about monitoring occasions in a type0-PDCCH search space set), and other bit(s) may signal frequency information about a CORESET within 20 MHz that does not correspond to frequency #X. Particularly, in signaling the frequency information about the CORESET within 20 MHz that does not correspond to frequency #X, less bit information than in 3GPP Rel-15 NR may be used and thus the frequency information may be signaled at a wider frequency interval (e.g., 20 MHz).

As the BS allows indication of frequency information about a CORESET within 20 MHz that does not correspond to frequency #X, the BS may reduce the overhead of transmitting SIB1 in every 20 MHz, even though the BS transmits an SSB in every 20 MHz.

[Method #3-2] Method of indicating a periodicity and/or an offset for configuring a CORESET (i.e., CORESET #0) that schedules an SIB1 PDSCH by an SSB (e.g., PBCH payload) transmitted in frequency #X For an initial access UE in NR-U, a default periodicity (e.g., 20 ms) for SSB transmission may be defined. A rule may be predefined such that a CORESET (e.g., CORESET #0) for a PDCCH that schedules an SIB1 PDSCH also has the same default periodicity. Transmission of SIB1 in every default period to transmit only operator ID, PLMN ID, or global cell ID information may cause big overhead to the BS. Therefore, to allow transmission with a longer periodicity than the default periodicity, information about the periodicity and/or offset (e.g., SFN #x (e.g., expressed as the number of frames from x=0)) of the CORESET may be indicated by an SSB (e.g., PBCH payload) transmitted in frequency #X.

The information about the periodicity and/or offset of the CORESET for the PDCCH that schedules the SIB1 PDSCH may be reinterpreted from information indicating frequency information (RB offset and/or RE offset) about CORESET #0 in legacy 3GPP Rel-15 NR. This is because when a plurality of synchronization rasters per 20 MHz (particularly at 5 GHz) are defined in NR-U, the UE may calculate the frequency information even though the frequency information about the CORESET is not indicated by the SSB (e.g., PBCH payload) transmitted in frequency #X.

Alternatively, as in [Method #3-1], frequency information about a CORESET within 20 MHz that does not correspond to frequency #X and information about the periodicity and/or offset of the CORESET may be simultaneously indicated by the SSB (e.g., PBCH payload) transmitted in frequency #X. Herein, some bit(s) of bits used to indicate another synchronization raster carrying RMSI in 3GPP Rel-15 NR may indicate the information about the periodicity and/or offset of the CORESET, and other bit(s) may signal the frequency information about the CORESET within 20 MHz that does not correspond to frequency #X. Particularly, in signaling the frequency information about the CORESET within 20 MHz that does not correspond to frequency #X, less bit information than in 3GPP Rel-15 NR may be used and thus the frequency information may be signaled at a wider frequency interval (e.g., 20 MHz).

[Method #3-3] SIB1x including information such as an operator/PLMN/global cell ID (i.e., a payload size is greatly reduced, compared to the legacy SIB1) may be configured and transmitted.

Transmitting entire RMSI in a non-standalone cell all the time to prevent cell ID collision may cause large overhead. Therefore, resources may be used efficiently by configuring compact SIB1 including information such as an operator/PLMN/global cell ID. Specifically, automatic neighbor relation (ANR) information may be included in the compact SIB1. The ANR information may include at least one of NR cell global identifier(s) (NCGI(s))/extended CGI(s) (ECGI(s)), tracking area code(s) (TAC(s)), RAN-based notification area code(s)(RANAC(s)), or public land mobile network (PLMN) ID(s). Information may be exchanged between BSs on the fly by ANR, and a self-organized network may be constructed. When the UE receives a PDCCH based on information about CORESET #0 and/or a type0-PDCCH CSS set provided by an SSB transmitted in a frequency other than a synchronization raster, and receives a PDSCH carrying SIB1, scheduled by the PDCCH, the UE may assume that the PDSCH carries compact SIB information.

<Method of Performing Measurement for Each Beam>

FIG. 20 illustrates an exemplary method of performing measurement for each beam. In RRC CONNECTED state, the UE may measure (at least one of) a plurality of beams from a cell and derive a cell quality by averaging the measurements (e.g., power values). Thus, the UE may be configured to consider a subset of detected beams. Filtering may be performed at two levels: after a beam quality is derived in the physical layer (A; Layer1 filtering), a cell quality may be derived from multiple beams at the RRC level (L3 beam filtering). Deriving a cell quality based on beam measurements may be performed equally in a serving cell and a non-serving cell. A measurement report may include the measurement results of X best beams.

[Method #4-1] Regarding measurement of a cell quality in "B" of FIG. 20, when a measurement result of each beam is transmitted to the higher layer (e.g., RRC layer) after Layer1 filtering, a cell quality value may be obtained from the measurement result (e.g., a received power level or reference signal received power (RSRP)) of specific beam(s) (e.g., best N beam(s)) based on a configured RRC parameter. The cell quality value may be used for radio resource management (RRM) measurement or cell (re)selection. In the NR-U system, the indexes of K beams may be the same as 20 SSB (candidate) indexes (for the 30-kHz SCS) or 10 SSB (candidate) indexes (for the 15-kHz SCS) in an STW. In this case, Layer1 filtering may not be performed. That is, a value measured in each measurement instance or STW may be used as an input to a beam consolidation/selection block in FIG. 20 as it is.

Alternatively, the K beam-specific indexes (i.e., an input of "A" in FIG. 20) may correspond to a specific SSB (candidate) index (e.g., a smallest SSB (candidate) index) among one or more SSB (candidate) indexes placed in the QCL relationship. When the UE reports a measurement result corresponding to the specific SSB (candidate) index to the higher layer, the UE may report a representative value (e.g., a maximum value) among the measurement result values corresponding to the one or more SSB (candidate) indexes QCLed with the corresponding SSB (candidate) index. This method may be used in measuring a cell quality and a beam quality (i.e., processes A1 and E in FIG. 20), and may be applied based on information about a Q value carried in PBCH payload.

[Method #4-2] When the UE is allocated (or configured by RRC signaling with) a specific SSB (candidate) index as a QCL source corresponding to a specific CSI-RS resource, the UE may assume that all SSB (candidate) indexes QCLed with the specific SSB (candidate) index are QCL sources of the CSI-RS resource. The assigned (or RRC-configured) specific SSB (candidate) index may correspond to a specific SSB (candidate) index (e.g., the smallest SSB (candidate) index) among the SSB (candidate) indexes in the QCL relationship. In this proposal, QCL may be defined as follows: when two antenna ports are QCLed, the UE may assume that the large-scale properties of a signal received from one antenna port may be derived from a signal received from the other antenna port. Alternatively, the above definition may be modified as an expression for channels as follows: when two antenna ports are QCLed, the UE may assume that the large-scale properties of a channel transmitted in a symbol through one antenna port may be derived from a channel transmitted in a symbol through the other antenna port. The large-scale properties may include at least one of the following properties.

Doppler shift
Doppler spread
Average delay
Delay spread
Spatial RX parameter

According to the above definition, the UE may not assume the same large-scale channel properties for "non-quasi-co-located (non-QCL) antenna ports". In this case, a typical UE receiver should perform processing independently for each configured non-QCL antenna port (AP), such as timing acquisition and tracking, frequency offset estimation and compensation, delay estimation, and Doppler estimation.

[Method #4-3] When the UE is allocated (or configured by RRC signaling with) a specific SSB (candidate) index corresponding to a specific L1-RSRP report (or configured by RRC signaling), the UE may calculate L1-RSRPs based on SSB (candidate) indexes QCLed with the specific SSB (candidate) index. Preferably, the UE may use all of the SSB (candidate) indexes QCLed with the specific SSB (candidate) index in the L1-RSRP calculation. In this case, the allocated (or RRC-configured) specific SSB (candidate) index may correspond to a specific index (e.g., the smallest SSB (candidate) index) among the QCLed SSB (candidate) indexes.

The same rule may be applied when SSB (candidate) indexes are associated with each other in the following configuration. For example, when the UE is allocated to (or configured by RRC signaling with) a specific SSB (candidate) index for radio link monitoring, the UE may use all SSB (candidate) indexes in the QCL relationship with the corresponding specific SSB (candidate) index in radio link monitoring corresponding to the SS/PBCH block (candidate) index.

Resources for beam failure request
CSI-RS for mobility
Reference resources for power control of PUCCH/sounding reference signal (SRS)
Reference resources for spatial information about PUCCH/SRS
Reference resource for path loss estimation of PUSCH/SRS
Resources for radio link monitoring In another example, referring to 3GPP TS 38.213 V15.6.0 (2018-06), Section 7.1.1, PUSCH transmission power may be generalized to Equation 3. For example, the PUSCH may be transmitted according to the procedure of FIG. 10.

$$P_{PUSCH} = P_{O\_PUSCH} + a + b^*PL + k + h \;\; \text{[dBm]} \qquad \text{[Equation 3]}$$

In Equation 3, $P_{O\_PUSCH}$ represents a value related to nominal PUSCH transmission power, a represents a power offset based on a PUSCH transmission band, b represents a weight configured by the higher layer, PL represents a DL path loss, k represents a power offset based on the code rate of data, and h represents a PUSCH power control value. For example, a may be expressed as $10 \log_{10}(2^u * M_{PUSCH})$ where u indicates an SCS index applied to PUSCH transmission (Table 1), and $M_{PUSCH}$ indicates a PUSCH band expressed as the number of RBs. h may be determined based on the value of a TPC field in a PDCCH that schedules the PUSCH.

In addition, referring to 3GPP TS 38.213 V15.6.0 (2018-06), Section 7.3.1, SRS transmission power may be generalized to Equation 4. The UE may transmit an SRS (a) periodically to the BS, and the BS may measure a UL channel state based on the SRS.

$$P_{srs} = P_{O\_SRS} + a + b^*PL + h \;\; \text{[dBm]} \qquad \text{[Equation 4]}$$

In [Equation 4], $P_{O\_SRS}$ represents the SRS transmission power configured by the higher layer, a represents a power offset based on an SRS transmission band, b represents a weight configured by the higher layer, PL represents a DL path loss, and h represents an SRS power control value. For example, a may be expressed as $10 \log_{10}(2^u * M_{SRS})$. u indicates an SCS index (Table 1), and $M_{SRS}$ indicates an SRS band expressed as the number of RBs.

According to 3GPP TS 38.213 V15.6.0 (2018-06), Sections 7.1.1 and 7.3.1, PL may be obtained as follows: the UE calculates PL using an RS resource obtained from an SS/PBCK block that the UE uses to obtain an MIB.

When this proposed method is applied, the PL in 3GPP TS 38.213 V15.6.0 (2018-06), sections 7.1.1 and 7.3.1 may be modified as follows: the UE calculates the PL using RS resource(s) obtained from SS/PBCH (candidate) block(s) with same SS/PBCK block index as the one the UE uses to obtain an MIB.

PUCCH transmission power may also be determined based on PL according to the proposed method. For details of the conventional PUCCH transmission power, refer to 3GPP TS 38.213 V15.6.0 (2018-06), Section 7.2.1.

Figure 19:
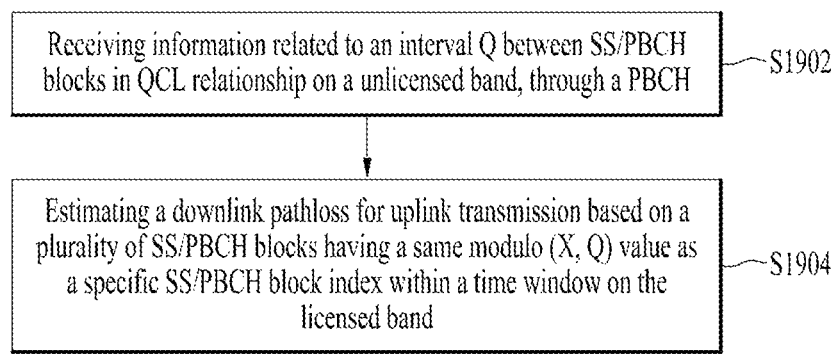

FIGS. 19 and 20 illustrate an exemplary channel measurement according to an embodiment of the present disclosure. Referring to FIG. 19, a UE may receive information related to an interval Q between QCLed SS/PBCH blocks in an unlicensed band on a PBCH (S1902). The UE may then estimate a DL path loss (PL) for a UL transmission based on a plurality of SS/PBCH blocks having the same modulo (X, Q) value as a specific SS/PBCH block index (S1904). The UL transmission may include an SRS transmission or a PUSCH transmission. The UE may determine UL transmission power based on the estimated DL PL and perform the UL transmission based on the determined UL transmission power. Modulo represents a modulo operation, X is an integer greater than or equal to 0, representing a value related to the time sequence of SS/PBCH blocks, and Q is a positive integer. Referring to FIG. 20, when a specific SS/PBCH block index is 1 and Q=4, a PL may be measured based on at least one of SS/PBCH block candidates satisfying modulo (X, 4)=1 in an STW, preferably based on all of the SS/PBCH block candidates. In addition, when a specific SS/PBCH block index is 1 and Q=8, a PL may be measured based on at least one of SS/PBCH block candidates satisfying modulo (X, 8)=1 in an STW, preferably based on all of the SS/PBCH block candidates. X may be an SS/PBCH block candidate index or a PBCH DMRS sequence index. In addition, Q may be less than the number of SS/PBCH blocks defined in a time window, and may be an integer of 2 or more.

2) Transmitter(Entity B):
<Type0-PDCCH Monitoring>

[Method #1A-1] A type0-PDCCH CSS set corresponding to a specific SS/PBCH block may be configured at an interval of L in an STW.

In this method, the specific SS/PBCH block may be an SS/PBCH block corresponding to a QCL index 'q' (q=0, 1, . . . , Q−1), a PBCH DMRS index 'd' (d=0, 1, . . . , 7), or an SS/PBCH block candidate index 'b' (b=0, 1, . . . , 19 for the 30-kHz SCS, and b=0, 1, . . . , 9 for the 15-kHz SCS).

In the STW, the interval L may be equal to Q, may be a value separately set in PBCH payload, or may be predefined as a specific value (e.g., L=8).

For example, when the specific SS/PBCH block is the SS/PBCH block corresponding to the QCL index 'q' (i.e., L=Q), a type0-PDCCH associated with the SS/PBCH block may be transmitted in slots corresponding to SS/PBCH block candidate indexes having the same modulo (SS/PBCH block candidate index, Q) value or (PBCH DMRS sequence index, Q) value. An actual transmission time may vary depending on the time at which the BS succeeds in a CAP. For example, when Q=4 and the SS/PBCH block detected by the UE corresponds to QCL index '2' in FIG. 14, the BS may transmit the type0-PDCCH associated with the SS/PBCH block in slots (e.g., slots #1/#3/#5/#7/#9) corresponding to PBCH DMRS sequence indexes 2/6/10/14/18 (or PBCH DMRS sequence indexes 2/6/2/6/2).

In another example, when the specific SS/PBCH block is the SS/PBCH block corresponding to the PBCH DMRS index 'd', the type0-PDCCH associated with the SS/PBCH block may be transmitted in slots corresponding to SS/PBCH block candidate indexes or (PBCH DMRS sequence indexes) having an interval of 8 (i.e., L=8) (or an interval indicated explicitly/implicitly) in the STW. Specifically, the type0-PDCCH associated with the SS/PBCH block may be transmitted in slots corresponding to the same modulo (SS/PBCH block candidate index, 8) value or SS/PBCH block candidate indexes having the same PBCH DMRS sequence index value (or the PBCH DMRS sequence index). An actual transmission time may vary depending on the time at which the BS succeeds in a CAP. For example, when the SS/PBCH block corresponds to PBCH DMRS index '2' in FIG. 14, the BS may transmit the type0-PDCCH associated with the SS/PBCH block in slots (e.g., slots #1/#5/#9) corresponding to SS/PBCH block candidate indexes 2/10/18 (or PBCH DMRS sequence index 2/2/2).

In another example, when L being a period for monitoring type0-PDCCH in an STW is configured by PBCH payload or predefined, a typ0-PDCCH associated with an SS/PBCH block may be transmitted in slots corresponding to SS/PBCH block candidate indexes 'b1+k*L' (k is an integer equal to or larger than 0; b1+k*L ranges from 0 to 19 in the 30-kHz SCS, and ranges 0 to 9 in the 15-kHz SCS), every interval of L from a specific SS/PBCH block candidate index 'b1' in the STW. For example, when L=5 and the SS/PBCH block detected by the UE corresponds to an SS/PBCH block candidate index '6' in FIG. 14, the BS may transmit the type0-PDCCH associated with the SS/PBCH block in slots (e.g., slots #0/#3/#5/#8) corresponding to SS/PBCH block candidate indexes 1/6/11/16.

A constraint may be imposed on the BS to actually transmit a type0-PDCCH associated with a specific SS/PBCH block (e.g., in the same beam direction) in the same slot as the specific SS/PBCH block. In other words, when the BS transmits a specific SS/PBCH block a certain slot after succeeding in a CAP, the BS may have to transmit a type0-PDCCH associated with the SS/PBCH block in the same slot. Alternatively, when the BS does not transmit a specific SS/PBCH block supposed to be transmitted in a certain slot, the BS may not transmit a type0-PDCCH associated with the SS/PBCH block in the same slot.

Alternatively, (1) a specific SS/PBCH block and (2) its associated type0-PDCCH may be allowed to be transmitted in different slots, and a slot offset between (1) the specific SS/PBCH block and (2) the associated type0-PDCCH may be signaled by PBCH payload.

In addition, when Q is unknown (e.g., when Q is signaled by SI, instead of PBCH payload), the proposed method may be applied by defining a default Q value. The default Q value may be 1 (i.e., it is assumed that there are type0-PDCCH monitoring occasions in all slots), or when there is a set of configurable Q values, the default Q value may be the minimum or maximum value of the set. Alternatively, depending on what value is set as M in Table 7 by the PBCH, the UE may assume a different Q value. For example, the UE may assume that when M=1/2, Q=2, and when M>1/2, Q=1. When Q=1 and M=1/2, the UE should perform type0-PDCCH monitoring at least twice in each slot, thereby increasing the PDCCH decoding complexity of the UE, and making it difficult for the BS to transmit another PDCCH in the corresponding type0-PDCCH monitoring occasions. Therefore, when Q=1, the UE may not expect type0-PDCCH monitoring twice in the same slot, compared to the case of M=1/2.

When candidate values for Q are {1, 2, 4, 8}, sub-sets of the Q values may be configured by 1-bit information of the PBCH payload (or MIB). This may be considered to minimize signaling of Q in consideration of the limited number of bits in the PBCH payload. For example, when the value of the corresponding 1-bit field is '0', it may signal that Q is one of {1, 2}, and when the value of the 1-bit field is '1', it may signal that Q is one of {4, 8}. In another example, when the value of the 1-bit field is '0', it may signal that Q is one of {1, 2, 4}, and when the value of the 1-bit field is '1', it may signal that Q is {8}. In another example, when the value of the 1-bit field is '0', it may signal that Q is one of {1, 2, 4}, and when the value of the 1-bit field '1', it may signal that Q is one of {4, 8}. In this case, the proposed method may be applied by defining a default Q value. The default Q value may be the minimum value (or maximum value) of a subset configured by the PBCH payload. For example, when the value '0' of the 1-bit field in the PBCH payload indicates that Q is one of {1, 2} and the value '1' of the 1-bit field indicates that Q is one of {4, 8}, a UE receiving '0' may assume the default Q=1, and a UE receiving '1' may assume that the default Q=4.

In the NR system, monitoring occasions are determined for a type0-PDCCH CSS set as illustrated in Table 7 (see Equation 1 and Equation 2). In the unlicensed band, when an STW is a 5-ms window starting from a frame boundary, Q=4, the index i of an equation determining n0 in [Equation 1] is replaced with an SS/PBCH block candidate index of FIG. 14, and index #1 of Table 7 is signaled, monitoring occasions may be determined for a type0-PDCCH CSS set as illustrated in FIG. 14. In FIG. 14, A0 indicates monitoring occasions for a type0-PDCCH CSS set linked to an SS/PBCH corresponding to QCL index #0 in an A period (i.e., slot indexes #0/1) at the slot level.

In another example, when index #2 of Table 7 is signaled, monitoring occasions may be determined for a type0-PDCCH CSS set as illustrated in FIG. 15.

When [Method #1A-1] is applied to FIG. 14, the UE may not perform type0-PDCCH monitoring for slot index #10. Therefore, the BS may not transmit a type0-PDCCH for slot index #10. In addition, when [Method #1A-1] is applied to FIG. 15, the UE may not perform type0-PDCCH monitoring for slot indexes #10 to #16. Therefore, the BS may not transmit a type0-PDCCH for slot indexes #10 to #16.

Further, when an STW is a 5-ms window starting from a frame boundary and one of the indexes #4/5/6/7/9/14/15 in Table 7 is signaled, the value of 0 is 5 or more and thus, the STW does not overlap with type0-PDCCH monitoring occasions (MOs). In this case, the STW and the type0-PDCCH MOs which do not overlap with the STW may increase resource consumption for reception of an SS/PBCH and SI. That is, when an STW is a 5-ms window (or a part thereof) starting from a frame boundary, the BS may not signal one of the indexes #4/5/6/7/9/14/15 of Table 7. Alternatively, when the STW belongs to the second 5 ms instead of the first 5 ms in a frame, the BS may not signal one of the indexes #0/1/2/3/8/10/11/12/13 of Table 7. In this case, type0-PDCCH monitoring may be allowed even outside the STW (e.g., slot index #10 of FIG. 14 and slot indexes #10 to #16 of FIG. 15). Therefore, even outside the STW (e.g., slot index #10 of FIG. 14 and slot indexes #10 to #16 of FIG. 15), the BS may transmit a type0-PDCCH.

[Method #1A-2] When two 1-symbol CORESETs, CORESET #0 corresponding to two SS/PBCH blocks (SSBs) are configured in the same slot (FIG. 16), beam switching operations/overhead of the BS/UE may be reduced by exchanging the symbol positions of CORESET #0 for SSB #n and CORESET #0 for SSB #n+1 with each other.

As one of the configurations for CORESET #0 and a type0-PDCCH CSS set provided by the legacy NR system, (1) an SSB and (2) a corresponding CORESET #0 may be transmitted in the same slot, and each CORESET #0 may be configured with 1 symbol, as illustrated in FIG. 16. Particularly in the NR-U system, even the BS may transmit a DL signal only when succeeding in a CAP. Accordingly, it may be advantageous from the viewpoint of DL transmission to collect and transmit related information in the same slot as much as possible and thus reduce the number of CAP attempts. However, in the case of transmission and reception as illustrated in FIG. 16, a problem may occur in a beam switching operation/overhead of the BS/UE, and thus this method is proposed to overcome the problem.

Referring to FIG. 16, CORESET #0 for SSB #n+1 may be transmitted in symbol #0, and CORESET #0 for SSB #n may be transmitted in symbol #1. According to the proposed method, the BS may perform a type0-PDCCH transmission corresponding to SSB #n in symbol #1 in slot #k, and a type0-PDCCH transmission corresponding to SSB #n+1 in symbol #0 in slot #k. Herein, an SSB index may mean an SS/PBCH block candidate index, a PBCH DMRS sequence index, or a QCL index in FIG. 13.

[Method #1A-3] When two 2-symbol CORESETs, CORESET #0 corresponding to two SS/PBCH blocks (SSBs) are configured in the same slot (e.g., FIG. 17), at least one of the following options may be applied.

As one of the configurations for CORESET #0 and a type0-PDCCH CSS set provided by the legacy NR system, (1) an SSB and (2) a corresponding CORESET #0 may be transmitted in the same slot, and each CORESET #0 may be configured with 2 symbols, as illustrated in FIG. 17. Particularly in the NR-U system, even the BS may transmit a DL signal only when succeeding in a CAP. Accordingly, it may be advantageous from the viewpoint of DL transmission to collect and transmit related information in the same slot as much as possible and thus reduce the number of CAP attempts (see FIG. 17). However, in the case of transmission and reception as illustrated in FIG. 17, a specific SSB may overlap with a CORESET (which is not associated with the SSB), and thus this method is proposed to overcome the problem.

Option 1: When two 2-symbol CORESETs, CORESET #0 are configured in the same slot, CORESET #0 for SSB #n+1 may be ignored in consideration of overlap between a CORESET and an SSB. That is, when two 2-symbol CORESETs, CORESET #0 are configured in the same slot, the UE may assume that (1) SSB #n+1 and (2) CORESET #0 for SSB #n+1 are not transmitted in a corresponding cell. Accordingly, an operation of detecting SSB #n+1 may be omitted. In FIG. 17, an SSB index may mean an SS/PBCH block candidate index, a PBCH DMRS sequence index, or a QCL index in FIG. 13.

Option 2: Upon detection of SSB #n+1, the UE may not transmit (1) SSB #n and (2) CORESET #0 for SSB #n in a corresponding slot, in consideration of overlap between a CORESET and an SSB. Alternatively, when the BS does not transmit SSB #n or signals no transmission of SSB #n, the BS may transmit (1) SSB #n+1 and (2) CORESET #0 for SSB #n+1 in slot #k in which SSB #n+1 may be transmitted, when succeeding in a CAP.

Option 3: The symbol positions of CORESET #0 for SSB #n and CORESET #0 for SSB #n+1 may be exchanged with each other over time. For example, when SSB #n and SSB #n+1 are also transmitted in slot #k+p (e.g., a time apart from slot #k by an STW duration), CORESET #0 for SSB #n+1 may be transmitted in symbol #0/1, and CORESET #0 for SSB #n may be transmitted in symbol #2/3 in slot #k+p. Herein, p may correspond to the STW duration or Q or L in Method #1-1. The BS may perform a type0-PDCCH transmission corresponding to SSB #n in symbol #0/1, and may not perform a type0-PDCCH transmission corresponding to SSB #n+1 or may perform a type0-PDCCH transmission corresponding to SSB #n+1 in symbol #2/3, in slot #k. In addition, the BS may perform a type0-PDCCH transmission corresponding to SSB #n in symbol #2/3, and may not perform a type0-PDCCH transmission corresponding to SSB #n+1 or may perform the type0-PDCCH transmission corresponding to SSB #n+1 in symbol #0/1, in slot #k+p.

<No RMSI Indication>

[Method #2A-1] In the case of an SS/PBCH block transmitted in a synchronization raster (or GSCN) defined in the unlicensed band, a constraint may be imposed on the BS to always signal a configuration for a type0-PDCCH CSS set by the SS/PBCH block.

In this method, the SS/PBCH block transmitted in the synchronization raster may refer to an SS/PBCH block transmitted with the synchronization raster (or GSCN) predefined in the unlicensed band (e.g., 5 GHz or 6 GHz band) used as the center frequency.

Different operators (or operators having different PLMN IDs) operating NR-U systems may coexist even in the same frequency band. In general, PLMN ID information may be signaled by an SIB. A type0-PDCCH CSS set may not be configured in the SS/PBCH block transmitted in the synchronization raster. Instead, information about another synchronization raster carrying an SIB may be signaled by the PBCH. In this case, the UE may move to the synchronization raster without determining whether the corresponding SS/PBCH block matches a PLMN ID servicing the UE, and a considerably large delay time may be involved in initial access. To solve this problem, the BS may be subjected to the constraint that the SS/PBCH block transmitted in the synchronization raster in the unlicensed band always configures a type0-PDCCH CSS set. More specifically, the value of k {SSB} signaled in the PBCH of the SS/PBCH block transmitted in the synchronization raster in the unlicensed band is 23 or less (or a value of k_{SSB} greater than 23 may not be signaled).

Alternatively, an SS/PBCH block transmitted in a frequency other than the synchronization raster (or GSCN) in the unlicensed band may be restrictively allowed as an SS/PBCH block that does not configure a type0-PDCCH CSS set.

Alternatively, the proposed method may also be applied to an SS/PBCH block transmitted in the frequency other than the synchronization raster (or GSCN) in the unlicensed band. As described in <RMSI transmission on SCell or non-standalone cell>, this is because there is a need for providing information about CORESET #0 and/or a Type0-PDCCH CSS set even in the PBCH of the SS/PBCH block transmitted in the frequency other than the synchronization raster to prevent confusion of the UE which may otherwise be caused by the use of the same ID between cells.

[Method #2A-2] A shortened PLMN ID value may be signaled by PBCH payload.

As described in [Method #2A-1], when a PLMN ID value is signaled by an SIB, a large delay time may be caused during initial access of the UE which has detected an SS/PBCH block that does not configure a type0-PDCCH CSS set. Therefore, the delay time may be reduced by directly signaling the PLMN ID value by PBCH payload. Specifically, when the PLMN ID value signaled by the PBCH payload is identical to a PLMN ID expected by the UE, and the corresponding PBCH indicates another GSCN value without configuring information about a type0-PDCCH CSS set, the UE may move to the GSCN value and receive an SS/PBCH block corresponding to the same PLMN ID value. In this case, the BS may provide only information about a GSCN that operates the PLMN ID in the PBCH payload to the UE. On the contrary, when the PLMN ID value signaled by the PBCH payload is different from the PLMN ID expected by the UE, and the corresponding PBCH indicates another GSCN value without configuring information about a type0-PDCCH CSS set, the UE may attempt to receive another SS/PBCH block in the current GSCN (or by moving to an additional GSCN) without moving to the corresponding GSCN value.

In addition, when the PBCH indicates another GSCN value without configuring type0-PDCCH CSS set information, the PBCH may signal a PLMN ID operating in the GSCN. Even though the PLMN ID value signaled by the PBCH is different from the PLMN ID value expected by the UE, when the PLMN ID value operating in the GSCN is identical to the PLMN ID value expected by the UE, the UE may move to the signaled GSCN and attempt to initial access.

In this method, a PLMN ID may be a value obtained by truncating N MSB (or LSB) bits from full information, not the full information, in consideration of PBCH payload. N is an integer greater than or equal to 1. For example, 2-bit shortened PLMN ID information obtained by truncating 3 or 4 MSB bits from a 5 or 6-bit PLMN ID may be signaled by PBCH payload.

[Method #2A-3] When an SS/PBCH block transmitted on GSCN #1 in the unlicensed band signals that a type0-PDCCH is transmitted on GSCN #2, the GSCN #2 value may be reinterpreted according to CAP-BW unit-based channelization.

In this method, GSCN #2=GSCN #1+offset and the offset may be signaled by a PBCH transmitted on GSCN #1.

In this method, a CAP-BW is a basic unit for performing a CAP/LBT, and a specific value for each frequency band may be predefined (e.g., the CAP-BW is 20 MHz in a 5-GHz band) or signaled. For coexistence with heterogeneous systems such as Wi-Fi and LTE LAA, channelization may be aligned in the CAP-BWP.

Multiple GSCNs may exist in a CAP-BW, and only a fairly limited number (e.g., 1 or 2) of synchronization rasters may be defined per CAP-BW in consideration of the initial access complexity of an NR-U UE. Therefore, the value of GSCN #2 may not match an actual synchronization raster position. According to the proposed method, the signaled GSCN #2 value may be reinterpreted as a synchronization raster closest to GSCN #2 or as a (specific) synchronization raster defined in the CAP-BW including GSCN #2. For example, the UE may identify that GSCN #2 belongs to a U-band from a frequency band to which GSCN #2 belongs, and a CAP-BW may be predefined for each U-band. Based on this, the UE may reinterpret the value of GSCN #2 as a synchronization raster closest to GSCN #2 or as a (specific) synchronization raster defined in the CAP-BW including GSCN #2. For example, the (specific) synchronization raster may be a synchronization raster closest to the center frequency of the CAP-BW or a synchronization raster having the smallest frequency value within the CAP-BW.

<RMSI Transmission on SCell or Non-Standalone Cell>

Since different operators may coexist in the unlicensed band, cells belonging to the different operators may have the same (physical) cell ID. To eliminate the resulting confusion of the UE, the BS may transmit higher-layer signaling (e.g., SIB1) including operator ID, PLMN ID, or global cell ID information. For example, when there is gNB #X transmitting an SSB in frequency #X (frequency #X may not identical to a synchronization raster), and there is UE #Y associated with gNB #Y, gNB #Y may instruct UE #Y to measure frequency #X. UE #Y, which has measured frequency #X, may report a detected cell ID of gNB #X and a measurement result of the corresponding cell to gNB #Y. When gNB #Y receiving the report is not aware that whether gNB #X is the same operator, gNB #Y may instruct the UE to read higher-layer signaling (e.g., SIB1) including the operator ID, PLMN ID, or global cell ID information about gNB #X and report corresponding information. After receiving the corresponding information about gNB #X from the UE, gNB #Y may update operator information about gNB #X. In consideration of this operation, gNB #X which transmits an SSB in frequency #X needs to explicitly or implicitly transmit information about PDCCH monitoring occasions for scheduling a PDSCH carrying the higher-layer signaling including the operator ID, PLMN ID, or global cell ID information (hereinafter referred to as SIB1 for convenience).

A method of configuring PDCCH monitoring occasion information for explicitly or implicitly scheduling a PDSCH carrying SIB1 and/or corresponding SIB1 information and/or configuring SIB information is proposed below.

[Method #3A-1] Method of indicating a specific synchronization raster in 20 MHz corresponding to frequency #X or 20 MHz not corresponding to frequency #X by an SSB (particularly, PBCH payload) transmitted in frequency #X When a plurality of synchronization rasters per 20 MHz (especially at 5 GHz) are defined in NR-U, a specific one of a plurality of synchronization rasters in 20 MHz corresponding to frequency #X may be signaled by an SSB (e.g., PBCH payload) transmitted in frequency #X. Alternatively, a specific synchronization raster value within 20 MHz other than the 20 MHz corresponding to frequency #X may be signaled by the SSB (e.g., PBCH payload) transmitted in frequency #X (e.g., a synchronization raster carrying RMSI is signaled with a granularity sparser than a granularity supported in [Method #2-30 or legacy Rel-15 NR). The UE may acquire frequency resource information about a CORESET including a PDCCH scheduling an SIB1 PDSCH, based on a pre-agreed PRB offset with respect to the signaled specific synchronization raster.

In signaling a specific synchronization raster value within 20 MHz other than the 20 MHz corresponding to frequency #X, frequency information about a CORESET within 20 MHz not corresponding to frequency #X and information about time-axis monitoring occasions of the CORESET may be simultaneously indicated by the SSB (e.g., PBCH payload) transmitted in frequency #X. Herein, some bit(s) of bits used to indicate another synchronization raster carrying RMSI in 3GPP Rel-15 NR may indicate information about time-axis monitoring occasions of a CORESET (or information about monitoring occasions in a type0-PDCCH CSS set), and other bit(s) may signal frequency information about a CORESET within 20 MHz that does not correspond to frequency #X. Particularly, in signaling the frequency information about the CORESET within 20 MHz that does not correspond to frequency #X, less bit information than in 3GPP Rel-15 NR may be used and thus the frequency information may be signaled at a wider frequency interval (e.g., 20 MHz).

As the BS allows indication of frequency information about a CORESET within 20 MHz that does not correspond to frequency #X, the BS may reduce the overhead of transmitting SIB1 in every 20 MHz, even though the BS transmits an SSB in every 20 MHz.

[Method #3A-2] Method of indicating a periodicity and/or an offset for configuring a CORESET (i.e., CORESET #0) that schedules an SIB1 PDSCH by an SSB (e.g., PBCH payload) transmitted in frequency #X For an initial access UE in NR-U, a default periodicity (e.g., 20 ms) for SSB transmission may be defined. A rule may be predefined such that a CORESET (e.g., CORESET #0) for a PDCCH that schedules an SIB1 PDSCH also has the same default periodicity. Transmission of SIB1 in every default period to transmit only operator ID, PLMN ID, or global cell ID information may cause big overhead to the BS. Therefore, to allow transmission with a longer periodicity than the default periodicity, information about the periodicity and/or offset (e.g., SFN #x (e.g., expressed as the number of frames from x=0)) of the CORESET may be indicated by an SSB (e.g., PBCH payload) transmitted in frequency #X.

The information about the periodicity and/or offset of the CORESET for the PDCCH that schedules the SIB1 PDSCH may be reinterpreted from information indicating frequency information (RB offset and/or RE offset) about CORESET #0 in legacy 3GPP Rel-15 NR. This is because when a plurality of synchronization rasters per 20 MHz (particularly at 5 GHz) are defined in NR-U, the UE may calculate the frequency information even though the frequency information about the CORESET is not indicated by the SSB (e.g., PBCH payload) transmitted in frequency #X.

Alternatively, as in [Method #3A-1], frequency information about a CORESET within 20 MHz that does not correspond to frequency #X and information about the periodicity and/or offset of the CORESET may be simultaneously indicated by the SSB (e.g., PBCH payload) transmitted in frequency #X. Herein, some bit(s) of bits used to indicate another synchronization raster carrying RMSI in 3GPP Rel-15 NR may indicate the information about the periodicity and/or offset of the CORESET, and other bit(s) may signal the frequency information about the CORESET within 20 MHz that does not correspond to frequency #X. Particularly, in signaling the frequency information about the CORESET within 20 MHz that does not correspond to frequency #X, less bit information than in 3GPP Rel-15 NR may be used and thus the frequency information may be signaled at a wider frequency interval (e.g., 20 MHz).

[Method #3A-3] SIB1x including information such as an operator/PLMN/global cell ID (i.e., a payload size is greatly reduced, compared to the legacy SIB1) may be configured and transmitted.

Transmitting entire RMSI in a non-standalone cell all the time to prevent cell ID collision may cause large overhead. Therefore, resources may be used efficiently by configuring compact SIB1 including information such as an operator/PLMN/global cell ID. Specifically, automatic neighbor relation (ANR) information may be included in the compact SIB1. The ANR information may include at least one of NR cell global identifier(s) (NCGI(s))/extended CGI(s) (ECGI(s)), tracking area code(s) (TAC(s)), RAN-based notification area code(s)(RANAC(s)), or public land mobile network (PLMN) ID(s). Information may be exchanged between BSs on the fly by ANR, and a self-organized network may be constructed. When the BS transmits a PDCCH in CORESET #0 and/or a type0-PDCCH CSS set provided by an SSB transmitted in a frequency other than a synchronization raster, and transmits a PDSCH carrying SIB1, scheduled by the PDCCH, the PDSCH may carry compact SIB information.

<Method of Performing Measurement for Each Beam>

[Method #4A-2] When the BS allocates a specific SSB (candidate) index as a QCL source corresponding to a specific CSI-RS resource, all SSB (candidate) indexes QCLed with the specific SSB (candidate) index may be QCL sources of the CSI-RS resource. The signaled specific SSB (candidate) index may correspond to a specific SSB (candidate) index (e.g., the smallest SSB (candidate) index) among the SSB (candidate) indexes in the QCL relationship.

[Method #4A-3] When the BS allocates a specific SSB (candidate) index corresponding to a specific L1-RSRP report (or configured by RRC signaling), the UE may calculate L1-RSRPs based on SSB (candidate) indexes QCLed with the specific SSB (candidate) index. Preferably, the UE may use all of the SSB (candidate) indexes QCLed with the specific SSB (candidate) index in the L1-RSRP calculation. In this case, the signaled specific SSB (candidate) index may correspond to a specific index (e.g., the smallest SSB (candidate) index) among the QCLed SSB (candidate) indexes.

The same rule may be applied when SSB (candidate) indexes are associated with each other in the following configuration. For example, when the BS allocates a specific SSB (candidate) index for radio link monitoring, the UE may use all SSB (candidate) indexes in the QCL relationship with the corresponding specific SSB (candidate) index in radio link monitoring corresponding to the SS/PBCH block (candidate) index.

Resources for beam failure request

CSI-RS for mobility

Reference resources for power control of PUCCH/sounding reference signal (SRS)

Reference resources for spatial information about PUCCH/SRS

Reference resource for path loss estimation of PUSCH/SRS

Resources for radio link monitoring

3) Receiver & Transmitter (Between Receiver and Transmitter)

Figure 21:
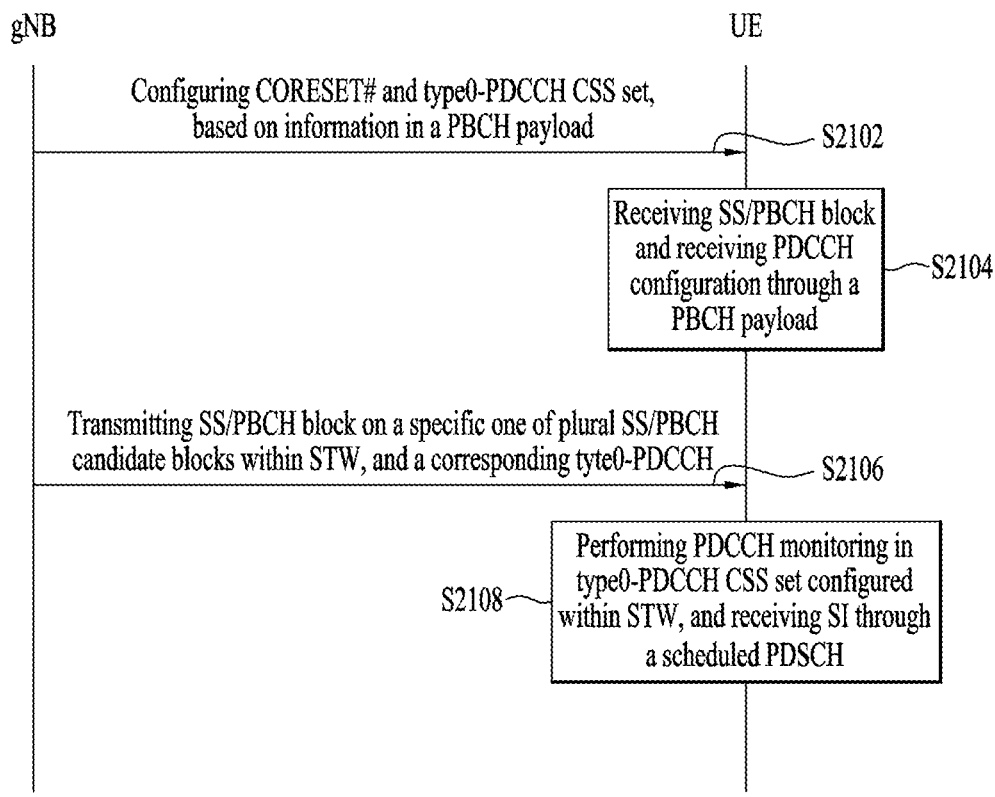
FIGS. 21 and 22 illustrate an exemplary system information (SI) reception process according to an embodiment of the present disclosure.

Referring to FIG. 21, a BS may transmit PDCCH configuration information on a PBCH (S2102). The PDCCH configuration information, which is for SI (e.g., SIB1) reception of a UE, may include information for configuring CORESET #0 and a type0-PDCCH CSS set. After detecting an SS/PBCH, the UE may receive the PDCCH configuration information on the PBCH (S2104). A relationship between the SS/PBCH block and CORESET #0 is defined according to the PDCCH configuration information. An STW includes a plurality of SS/PBCH transmission candidates, and an actual transmission time may be determined according to a time at which the BS succeeds in a CAP. Accordingly, the BS may transmit the SS/PBCH block in one of the plurality of SS/PBCH transmission candidates and transmit a type0-PDCCH in an associated CORESET #0/type0-PDCCH CSS set (S2106). The UE may perform PDCCH monitoring in the type0-PDCCH CSS set configured in the STW and receive SI on a PDSCH scheduled by the PDCCH (S2108). For more details, [Method #1-1] to [Method #1-3] and [Method #1A-1] to [Method #1SA-3] may be referred to.

Figure 22:
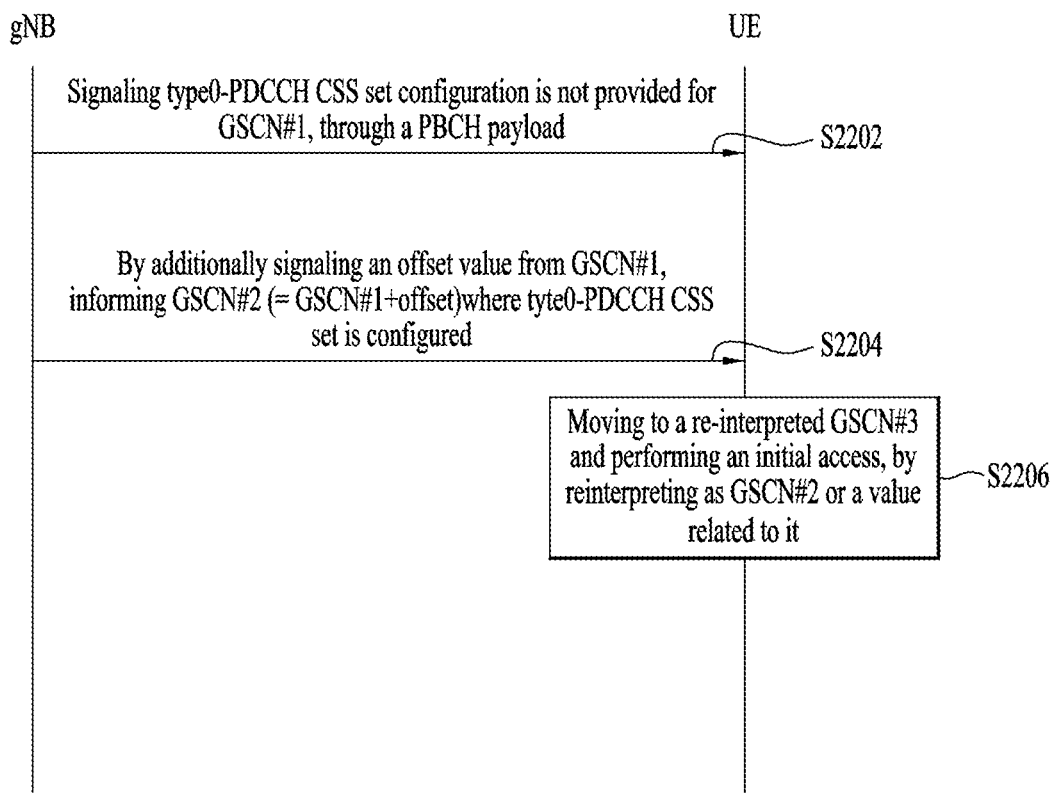

Referring to FIG. 22, the BS may signal no configuration of a type0-PDCCH CSS set corresponding to a GSCN (e.g., GSCN #1) carrying an SS/PBCH block by PBCH payload (S2202). Further, to indicate a GSCN (e.g., GSCN #2) configured with a type0-PDCCH CSS set, the BS may additionally signal an offset value from GSCN #1 (e.g., GSCN #2=GSCN #1+offset) (S2204). In this case, the offset value from GSCN #1 may be reinterpreted according to a CAP-BWP to which GSCN #2 belongs. The UE may move to the reinterpreted GSCN (e.g., GSCN #3) and then perform initial access again (S2206). For more details, [Method #2-1] to [Method #2-3] and [Method #2A-1] to [Method 2A-3] may be referred to.

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
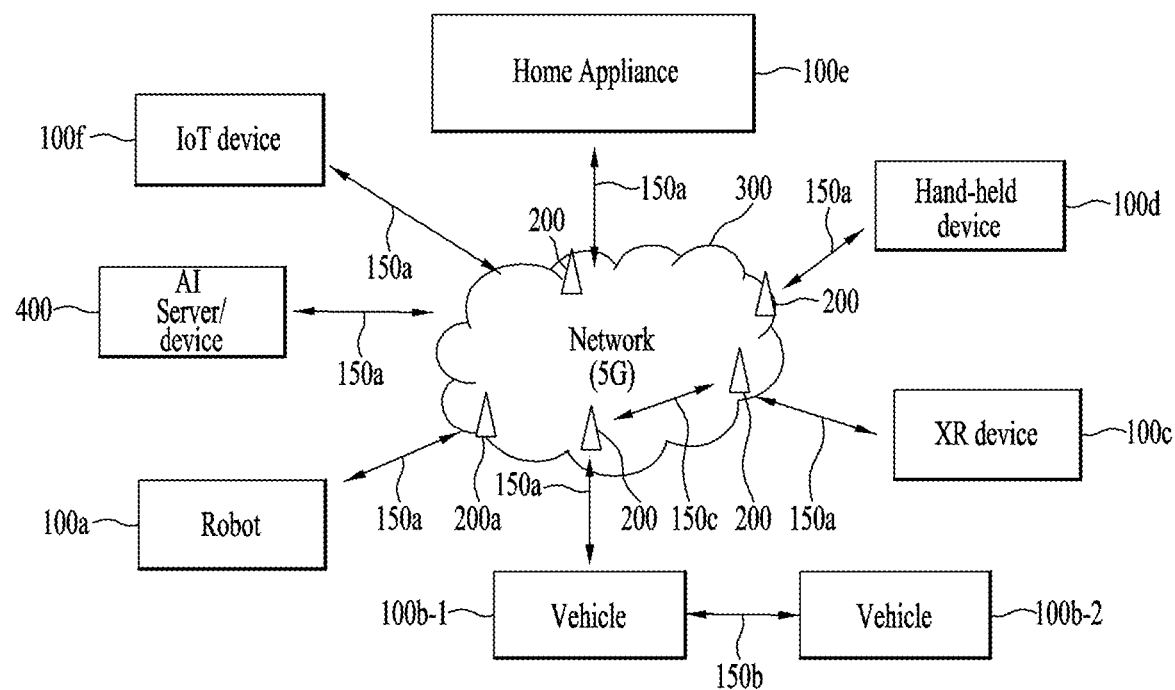
FIGS. 23 to 26 illustrate a communication system 1 and wireless devices, which are applied to the present disclosure.

FIG. 23 illustrates a communication system 1 applied to the present disclosure.

Referring to FIG. 23, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
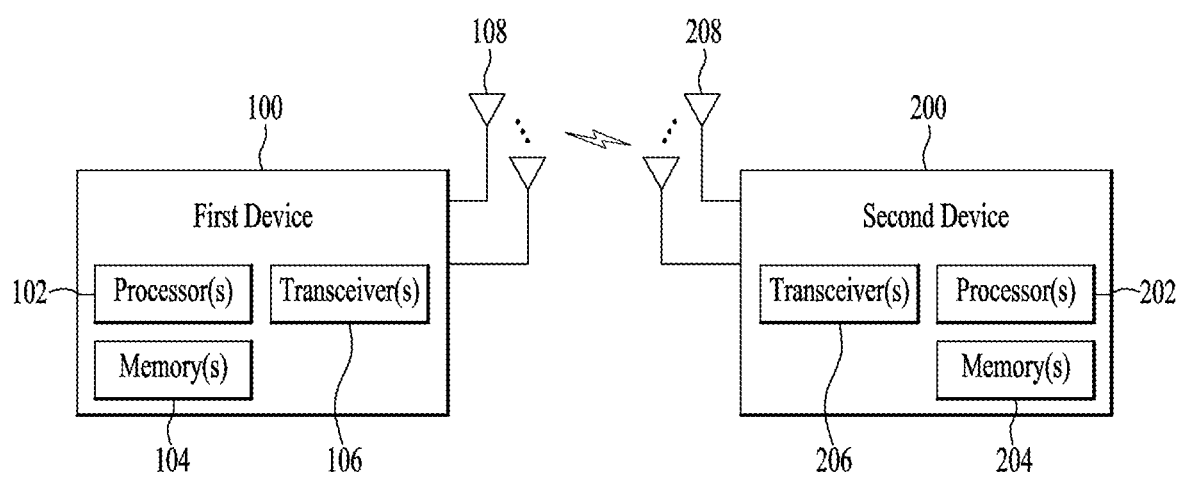

FIG. 24 illustrates wireless devices applicable to the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

Figure 25:
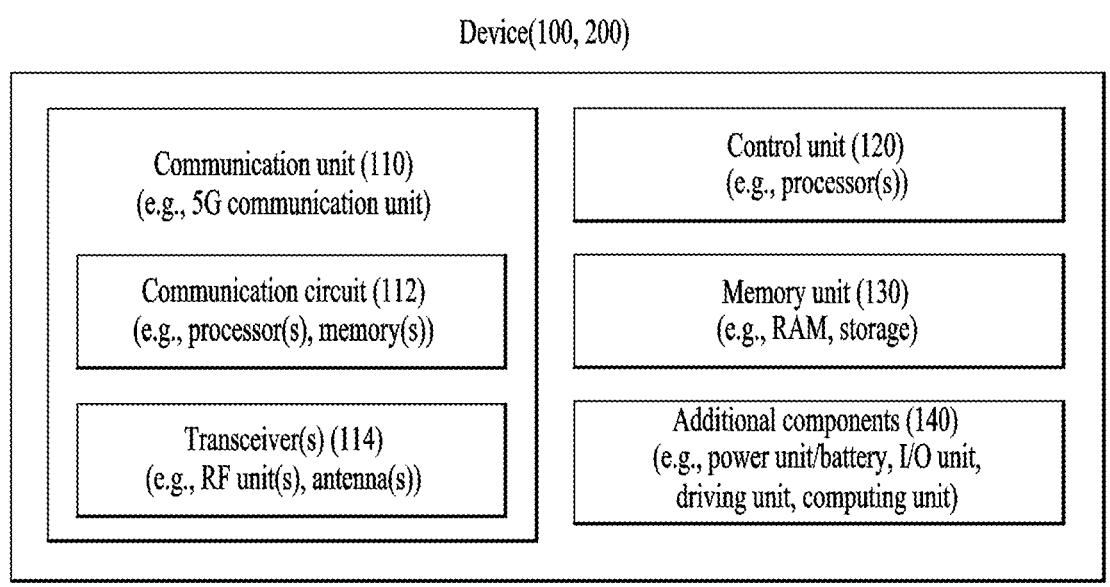

FIG. 25 illustrates another example of a wireless device applied to the present disclosure. The wireless device may be implemented in various forms according to a use-case/service (refer to FIG. 23).

Referring to FIG. 25, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 23), the vehicles (100*b*-1 and 100*b*-2 of FIG. 23), the XR device (100*c* of FIG. 23), the hand-held device (100*d* of FIG. 23), the home appliance (100*e* of FIG. 23), the IoT device (100*f* of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

The wireless communication technology implemented in the wireless devices 100 and 200 of the present specification may include narrowband Internet of Things (NB-IoT) for low-power communication as well as LTE, NR, and 6G. For example, NB-IoT technology may be an example of low power wide area network (LPWAN) and implemented by standards such as LTE Cat NB1 and/or LTE Cat NB2, not limited to the above-mentioned names. Additionally or alternatively, the wireless communication technology implemented in the wireless devices 100 and 200 of the present disclosure may perform communication based on LTE-M. For example, LTE-M may be an example of LPWAN and called by various names such as enhanced machine type communication (eMTC). For example, LTE-M may be implemented by at least one of various standards such as 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M, not limited to these names. Additionally or alternatively, the wireless communication technology implemented in the wireless devices 100 and 200 of the present disclosure may include at least one of ZigBee, Bluetooth, and low power wide area network (LPWAN) in consideration of low power communication, not limited to these names. For example, ZigBee may create a personal area network (PAN) related to small/low-power digital communication based on various standards such as IEEE 802.15.4, and may be called by various names.

Figure 26:
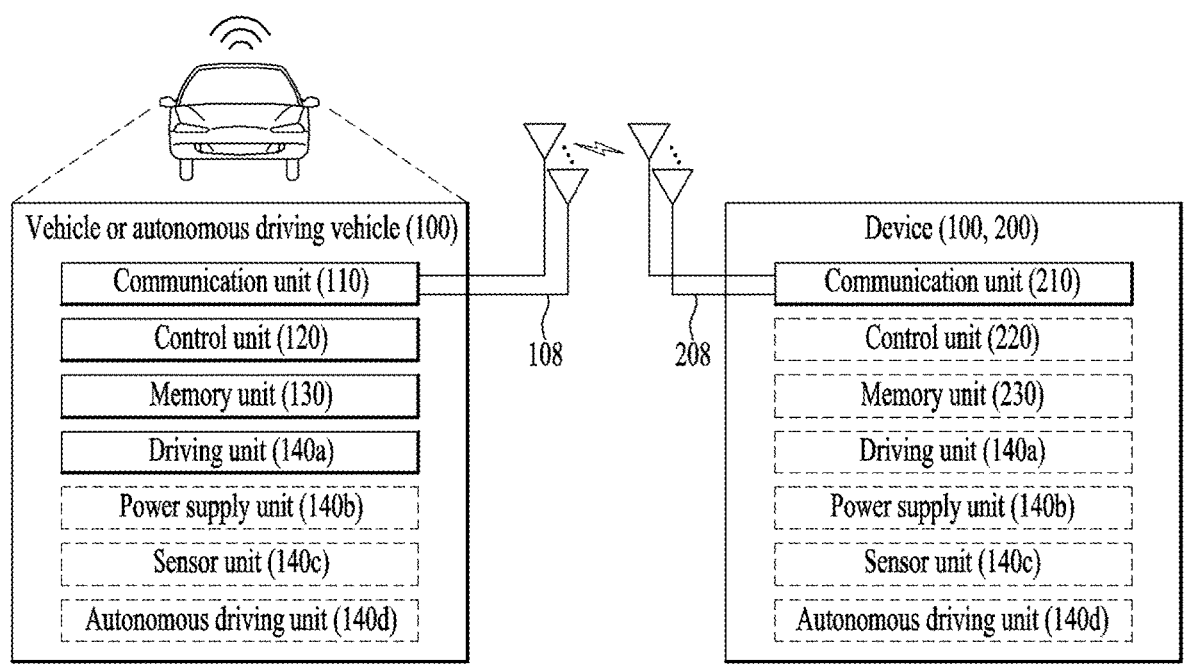

FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure may be used for a UE, a BS, or other equipment in a wireless mobile communication system.

What is claimed is:

1. A method of performing a channel measurement by a user equipment (UE) in a wireless communication system, the method comprising:

receiving information related to an interval Q between a plurality of synchronization signal/physical broadcast channel (SS/PBCH) blocks in a quasi-co-located (QCL) relationship on an unlicensed band, through a physical broadcast channel (PBCH); and estimating a downlink path loss for an uplink transmission based on the plurality of SS/PBCH blocks having a same modulo (X, Q) value within a time window on the unlicensed band, wherein modulo represents a modulo operation, wherein X is an integer equal to or larger than 0 that represents an SS/PBCH block candidate index related to a time order of an SS/PBCH block within the time window, and wherein Q is a positive integer.

2. The method according to claim 1,
wherein Q is less than the number of the plurality of SS/PBCH blocks defined in the time window.

3. The method according to claim 1,
wherein Q is an integer equal to or larger than 2.

4. The method according to claim 1,
wherein the downlink path loss is estimated based on all of the plurality of SS/PBCH blocks having the same modulo (X, Q) value.

5. The method according to claim 1,
wherein the uplink transmission includes a sounding reference signal (SRS) or a physical uplink shared channel (PUSCH).

6. A user equipment (UE) configured to operate in a wireless communication system, the UE comprising:
at least one processor; and
at least one computer memory which is operably coupled to the at least one processor and storing in instructions that, when executed, causes the at least one processor to perform operations,
wherein the operations include:
receiving information related to an interval Q between a plurality of synchronization signal/physical broadcast channel (SS/PBCH) blocks in a quasi-co-located (QCL) relationship on an unlicensed band, through a physical broadcast channel (PBCH); and
estimating a downlink path loss for an uplink transmission, based on the plurality of SS/PBCH blocks having a same modulo (X, Q) value within a time window on the unlicensed band, and
wherein modulo represents a modulo operation, wherein X is an integer equal to or larger than 0 that represents an SS/PBCH block candidate index related to a time order of an SS/PBCH block within the time window, and wherein Q is a positive integer.

7. The UE according to claim 6,
wherein Q is less than the number of the plurality of SS/PBCH blocks defined in the time window.

8. The UE according to claim 6,
wherein Q is an integer equal to or larger than 2.

9. The UE according to claim 6,
wherein the downlink path loss is estimated based on all of the plurality of SS/PBCH blocks having the same modulo (X, Q) value.

10. The UE according to claim 6,
wherein the uplink transmission includes a sounding reference signal (SRS) or a physical uplink shared channel (PUSCH).

11. An apparatus for a user equipment (UE), comprising:
at least one processor; and
at least one computer memory which is operably coupled to the at least one processor and storing instructions that, when executed, causes the at least one processor to perform operations,
wherein the operations include:
receiving information related to an interval Q between a plurality of synchronization signal/physical broadcast channel (SS/PBCH) blocks in a quasi-co-located (QCL) relationship on an unlicensed band, through a physical broadcast channel (PBCH); and
estimating a downlink path loss for an uplink transmission based on the plurality of SS/PBCH blocks having a same modulo (X, Q) value within a time window in the unlicensed band,
wherein modulo represents a modulo operation, wherein X is an integer equal to or larger than 0 that represents an SS/PBCH block candidate index related to a time order of an SS/PBCH block within the time window, and wherein Q is a positive integer.

12. The apparatus according to claim 11,
wherein Q is less than the number of the plurality of SS/PBCH blocks defined in the time window.

13. The apparatus according to claim 11,
wherein Q is an integer equal to or larger than 2.

14. The apparatus according to claim 11,
wherein the downlink path loss is estimated based on all of the plurality of SS/PBCH blocks having the same modulo (X, Q) value.

15. The apparatus according to claim 11,
wherein the uplink transmission includes a sounding reference signal (SRS) or a physical uplink shared channel (PUSCH).

* * * * *